(12) United States Patent
Jin et al.

(10) Patent No.: US 7,402,612 B2
(45) Date of Patent: Jul. 22, 2008

(54) STABILIZED TRANSITION ALUMINA CATALYST SUPPORT FROM BOEHMITE AND CATALYSTS MADE THEREFROM

(75) Inventors: Yaming Jin, Ponca City, OK (US); Rafael L. Espinoza, Ponca City, OK (US); Nithya Srinivasan, Ponca City, OK (US); Olga P. Ionkina, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 768 days.

(21) Appl. No.: 10/687,140

(22) Filed: Oct. 16, 2003

(65) Prior Publication Data

US 2004/0127586 A1 Jul. 1, 2004

Related U.S. Application Data

(60) Provisional application No. 60/419,021, filed on Oct. 16, 2002.

(51) Int. Cl.
*C01F 7/02* (2006.01)
*B01J 23/02* (2006.01)
(Continued)

(52) U.S. Cl. ............... 518/713; 423/625; 423/628; 502/302; 502/303; 502/304; 502/305; 502/306; 502/307; 502/308; 502/309; 502/310; 502/311; 502/312; 502/317; 502/318; 502/319; 502/320; 502/321; 502/322; 502/324; 502/326; 502/328; 502/330; 502/331; 502/332; 502/333; 502/334; 502/335; 502/337; 502/339; 502/340; 502/341; 502/342; 502/343; 502/344; 502/345; 502/346; 502/347; 502/348; 502/349; 502/350; 502/351; 502/352; 502/353; 502/354; 502/355; 518/714; 518/715; 518/728

(58) Field of Classification Search ............... 423/111, 423/600, 625, 628; 518/715, 717, 719, 721, 518/713, 714, 728; 502/355, 302, 303, 304, 502/305, 306, 307, 308, 309, 310, 311, 312, 502/317, 318, 319, 320, 321, 322, 324, 326, 502/328, 330, 331, 332, 333, 334, 335, 337, 502/339, 340, 341, 342, 343, 344, 345, 346, 502/347, 348, 349, 350, 351, 352, 353, 354
See application file for complete search history.

(56) References Cited

U.S. PATENT DOCUMENTS 858,258 A 6/1907 Briscoe et al.
(Continued)

FOREIGN PATENT DOCUMENTS

GB 640965 8/1950
(Continued)

OTHER PUBLICATIONS

Ihns Schulz; Short History and Present Trends of Fischer-Tropsch Synthesis; Abstract; Universiot Karlsruhe, Germany; 10 pages.
(Continued)

*Primary Examiner*—Stanley S. Silverman
*Assistant Examiner*—James Fiorito
(74) *Attorney, Agent, or Firm*—Conley Rose P.C.

(57) ABSTRACT

This invention relates to methods for making a stabilized transition alumina of enhanced hydrothermal stability, which include the introduction of at least one structural stabilizer; a steaming step before or after the introduction step, wherein steaming is effective in transforming a transition alumina at least partially to boehmite and/or pseudoboehmite; and a calcining step to create a stabilized transition alumina. The combination of the structural stabilizer and the steaming step is believed to impart high hydrothermal stability to the alumina crystal lattice. Particularly preferred structural stabilizers include boron, cobalt, and zirconium. The stabilized transition alumina is useful as a catalyst support for high water partial pressure environments, and is particularly useful for making a catalyst having improved hydrothermal stability. The invention more specifically discloses Fischer-Tropsch catalysts and processes for the production of hydrocarbons from synthesis gas.

65 Claims, 4 Drawing Sheets

(51) Int. Cl.

| | |
|---|---|
| *B01J 23/04* | (2006.01) |
| *B01J 23/06* | (2006.01) |
| *B01J 23/08* | (2006.01) |
| *B01J 23/10* | (2006.01) |
| *B01J 23/12* | (2006.01) |
| *B01J 23/14* | (2006.01) |
| *B01J 23/16* | (2006.01) |
| *B01J 23/18* | (2006.01) |
| *B01J 23/20* | (2006.01) |
| *B01J 23/22* | (2006.01) |
| *B01J 23/24* | (2006.01) |
| *B01J 23/26* | (2006.01) |
| *B01J 23/28* | (2006.01) |
| *B01J 23/30* | (2006.01) |
| *B01J 23/31* | (2006.01) |
| *B01J 23/32* | (2006.01) |
| *B01J 23/34* | (2006.01) |
| *B01J 23/36* | (2006.01) |
| *B01J 23/38* | (2006.01) |
| *B01J 23/40* | (2006.01) |
| *B01J 23/42* | (2006.01) |
| *B01J 23/44* | (2006.01) |
| *B01J 23/46* | (2006.01) |
| *B01J 23/48* | (2006.01) |
| *B01J 23/50* | (2006.01) |
| *B01J 23/52* | (2006.01) |
| *B01J 23/54* | (2006.01) |
| *B01J 23/56* | (2006.01) |
| *B01J 23/58* | (2006.01) |
| *B01J 23/63* | (2006.01) |
| *B01J 23/66* | (2006.01) |
| *B01J 23/68* | (2006.01) |
| *B01J 23/70* | (2006.01) |
| *B01J 23/72* | (2006.01) |
| *B01J 23/74* | (2006.01) |
| *B01J 23/755* | (2006.01) |
| *B01J 23/76* | (2006.01) |
| *B01J 23/78* | (2006.01) |
| *B01J 23/80* | (2006.01) |
| *B01J 23/825* | (2006.01) |
| *B01J 23/83* | (2006.01) |
| *B01J 23/835* | (2006.01) |
| *B01J 23/84* | (2006.01) |
| *B01J 23/843* | (2006.01) |
| *B01J 23/89* | (2006.01) |

U.S. PATENT DOCUMENTS

| | | | |
|---|---|---|---|
| 2,737,370 A | 3/1956 | Frisch et al. | |
| 2,892,858 A | 6/1959 | Ziegler | |
| 3,628,914 A | 12/1971 | Graulier | |
| 3,669,904 A | 6/1972 | Cornelius et al. | 252/465 |
| 3,852,190 A | 12/1974 | Buss et al. | |
| 3,894,963 A | 7/1975 | Gerdes et al. | 252/464 |
| 4,002,720 A | 1/1977 | Wheelock et al. | |
| 4,012,313 A | 3/1977 | Buss et al. | |
| 4,063,851 A | 12/1977 | Weldon | |
| 4,224,192 A | 9/1980 | Foster et al. | |
| 4,387,085 A | 6/1983 | Fanelli et al. | |
| 4,499,203 A | 2/1985 | Toulhoat et al. | |
| 4,602,000 A | 7/1986 | Dupin et al. | |
| 4,617,183 A | 10/1986 | Lewis et al. | |
| 4,708,945 A | 11/1987 | Murrell et al. | |
| 4,744,974 A | 5/1988 | Lewis et al. | |
| 4,830,100 A | 5/1989 | Kato et al. | |
| 4,831,007 A | 5/1989 | Murrell et al. | |
| 4,891,127 A | 1/1990 | Murrell et al. | |
| 5,055,019 A | 10/1991 | Meyer et al. | |
| 5,102,851 A | 4/1992 | Eri et al. | |
| 5,116,879 A | 5/1992 | Eri et al. | |
| 5,134,107 A | 7/1992 | Narula | |
| 5,232,580 A | 8/1993 | Le et al. | |
| 5,244,648 A | 9/1993 | Dupin et al. | |
| 5,467,816 A | 11/1995 | Larinoff | |
| 5,511,613 A | 4/1996 | Mohn et al. | |
| 5,837,634 A | 11/1998 | McLaughlin et al. | |
| 5,874,381 A | 2/1999 | Bonne et al. | |
| 5,960,866 A | 10/1999 | Kimura et al. | |
| 6,063,358 A | 5/2000 | Lindquist et al. | |
| 6,066,308 A | 5/2000 | Dupin et al. | |
| 6,125,035 A | 9/2000 | Hood, III et al. | |
| 6,224,846 B1 | 5/2001 | Hurlburt et al. | |
| 6,234,210 B1 | 5/2001 | Millas | |
| 6,255,358 B1 | 7/2001 | Singleton et al. | |
| 6,262,132 B1 | 7/2001 | Singleton et al. | |
| 6,271,432 B2 | 8/2001 | Singleton et al. | 585/700 |
| 6,303,531 B1 | 10/2001 | Lussier et al. | |
| 6,382,307 B1 | 5/2002 | Wang et al. | |
| 6,400,565 B1 | 6/2002 | Shabbir et al. | |
| 6,408,934 B1 | 6/2002 | Ishida et al. | |
| 6,503,867 B1 | 1/2003 | Stamires et al. | 502/335 |
| 6,773,690 B1 | 8/2004 | Noweck et al. | |
| 6,806,226 B2 | 10/2004 | Van Berge et al. | |
| 6,835,690 B2 | 12/2004 | Van Berge et al. | |
| 2002/0155946 A1 | 10/2002 | Bogdan et al. | |
| 2003/0032554 A1 | 2/2003 | Park et al. | |
| 2003/0162849 A1 | 8/2003 | Van Berge et al. | |
| 2004/0186188 A1 | 9/2004 | Van Berge et al. | |

FOREIGN PATENT DOCUMENTS

| | | |
|---|---|---|
| GB | 1058988 | 2/1967 |
| GB | 2 352 194 A | 1/2001 |
| JP | 58-19636 | 2/1983 |
| WO | WO 99/42214 | 8/1999 |
| WO | WO 00/45948 | 8/2000 |
| WO | WO 01/76735 A1 | 10/2001 |
| WO | WO 01/87480 A1 | 11/2001 |
| WO | WO 02/07883 A2 | 1/2002 |
| WO | WO 03/012008 A2 | 2/2003 |
| WO | 2004/035194 | 4/2004 |
| ZA | 2001/6213 | 7/2001 |

OTHER PUBLICATIONS

M. Absi-Halabi, et al.; "Studies on Pore Slze Control of Alumina: Preparation of Alumina Catalyst Extrudates with Large Unimodal Pore Structure by Low Temperature Hydrothermal Treatment"; Preparation of Catalysts V, 1991 Elsevier Science Publishers B.V., Amsterdam, pp. 155-163.

Alcoa World Chemical; "High purity, high density, gamma phase alumina"; Alcoa Product Data USA/6080-RO2/0601; 2 pages.

Alcoa World Chemical; "High purity, high density, boehmite aluminas"; Alcoa Product Data Sheet USA/6070-RO4/0801; 2 pages.

Condea; "High purity activated aluminas Puralox, Catalox"; Product Information Sheet Oct. 1999; 6 pages.

Rong-Sheng Zhou, et al.; "Structures and Transformation Mechanisms of the η, γ and θ Transition Aluminas"; International Union of Crystallography 1991; Institute for Ceraminc Superconductivity, New York State College of Ceramics, Alfred University, Alfred, NY 14802, USA; pp. 617-630.

Richard L. Smith, et al.; "The Influence of Diaspore Seeding and Chlordie Concentration on the Transformation of 'Diasporic' Precursors to Corundum"; Journal of the American Ceramic Society, Oct. 16, 2000; 31 pages.

S. Matsuda, et al.; "A New Support Material for Catalytic Combustion Above 1000° C."; 8th International Congress on Catalysis; vol. IV: Impact of surface science on catalysis, structure-selectivity/activity correlations, new routes for catalyst synthesis, pp. IV-879-IV-889.

H.C. Stumpf, et al.; "Thermal Transformations of Aluminas and Alumina Hydrates"; Industrial and Engineering Chemistry, vol. 42, No. 7, Jul. 1950; pp. 1398-1403.

Shu-Hui Cai, et al.; "Atomic Scale Mechanism of the Transformation of γ-Alumina to θ-Alumina"; The American Physical Society 2002; Physical Review Letters, vol. 89, No. 23; Dec. 2, 2002; 4 pages.

Zhong-Wen Liu, et al.; "Partial Oxidation of Methane Over Nickel Catalysts Supported on Various Aluminas"; Korean J. Chem. Eng., vol. 19, No. 5, pp. 735-741 (2002).

Hyun-Seog Roh, et al.; "Partial Oxidation of Methane Over Ni/θ-$Al_2O_3$ Catalysts"; Chemistry Letters 2001; Mar. 19, 2001; pp. 666-667.

Hyun-Seog Roh, et al.; "Partial Oxidation of Methane Over Ni/Ce-$ZrO_2$/θ-$Al_2O_3$"; Korean J. Chem. Eng., vol. 19, No. 5; pp. 742-748 (2002).

Hiromichi Arai, et al.; "Thermal stabilization of catalysts supports and their application to high-temperature catalytic combustion"; Applied Catalysis A: General 138 (1996); pp. 161-176; Elsevier Science Publishers B.V., Amsterdam.

Bernard Beguin et al.; "Stabilization of alumina by addition of lanthanum"; Applied Catalysis A: General 138 (1996); pp. 161-176; Elsevier Science Publishers B.V., Amsterdam.

Francois Oudet, et al.; "Thermal Stabilization of Transition Alumina by Structural Coherence with $LnAlO_3$ (Ln=La, Pr, Nd)"; Journal of Catalysts vol. 114; pp. 112-120 (1988).

H. Schaper, et al.; "The Influence of Lanthanum Oxide on the Thermal Stability of Gamma Alumina Catalyst Supports"; Applied Catalysis, vol. 7 (1983), pp. 211-220; Elsevier Science Publishers B.V., Amsterdam.

Jalajakumari Nair, et al.; "Pore Structure Evolution of Lanthana-Alumina Systems Prepared Through Coprecipitation"; J. Am Ceram. Soc., vol. 83, No. 8; pp. 1942-1946 (2000).

S. N. Rashkeev, et al.; "Transition metal atoms on different alumina phases: The role of subsurface sites on catalytic activity"; Physical Review B, vol. 67, No. 115414; 4 pages.

Hennie Schaper, et al.; "Thermal Stabilization of High Surface Area Lumina"; Solid State Ionics, vol. 16 (1985), pp. 261-266.

Xiaoyin Chen, et al.; "High temperature thermal stabilization of alumina modified b lanthanum species"; Applied Catalysis A: General, vol. 205 (2001); pp. 159-172.

S. Subramanian, et al.; "Characterization of lanthana/alumina composite oxides"; Journal of Molecular Catalysis, vol. 69 (1991); pp. 235-245.

P. Souza Santos, et al.; "Standard Transition Aluminas. Electron Microscopy Studies"; Materials Research, vol. 3, No. 4; pp. 104-114 (2000).

M. Absi-Halabi, et al., "Preparation of Catalysts V", Elsevier Science Publishers B.V., Amsterdam (1991), pp. 155-163.

H. Pham, et al.; "The synthesis of attrition resistant slurry phase iron Fischer-Tropsch catalysts"; Catalysis Today, vol. 58 (2000) pp. 233-240.

E.R. Becker, N.Y., Marcel Dekker Inc.; "Design of Fischer-Tropsch Catalysts," pp. 215-225.

Database CAPLUS on STN Chemical Abstract (Columbus Ohio, USA) CA:2000:795147, Fishcer-Tropsch Catalyst, American Chemical Society (2000), 220th, Fuel-048 see abstract.

PCT International Search Report for International Application No. PCT/US03/33460 dated Mar. 5, 2004 (2 p.).

STABILIZED TRANSITION ALUMINA CATALYST SUPPORT FROM BOEHMITE AND CATALYSTS MADE THEREFROM

CROSS-REFERENCE TO RELATED APPLICATION

This non-provisional application claims the benefit of U.S. Provisional Application No. 60/419,021, filed Oct. 16, 2002, which is hereby incorporated by reference in its entirety.

STATEMENT REGARDING FEDERALLY SPONSORED RESEARCH OR DEVELOPMENT

Not applicable.

FIELD OF THE INVENTION

The present invention relates to a stabilized transition alumina catalyst support comprising at least one structural stabilizer and to a catalyst made therefrom of high hydrothermal stability. The methods of making the catalyst support include steaming a transition alumina to transform it at least partially to a boehmite material. The present invention particularly relates to catalysts useful in high water partial pressure environments. The present invention further relates to a Fischer-Tropsch process comprising converting syngas with the hydrothermally stable catalysts to produce hydrocarbons.

BACKGROUND OF THE INVENTION

A heterogeneous catalytic process is a chemical reaction that takes place between gaseous and/or liquid reactants and a solid catalyst, where a catalyst is defined as something that accelerates a chemical reaction without being ultimately changed. In reactor configurations including, but not limited to, fixed bed, fluidized bed and slurry phase reactors, it is desirable to optimize the extent of contact between the reactants and the solid catalyst while addressing other important issues such as heat transfer, mass transfer, product removal and gas recycling. With respect to supported catalysts, control of the morphological properties of the support, such as surface area, pore volume, pore size and concentration of the pores per unit volume of support material is desirable because these properties can affect the course of the reaction and the products obtained therefrom. In particular, such properties tend to influence the nature and concentration of active catalytic sites, the diffusion of the reactants to the active catalyst site, the diffusion of products from the active sites, and the useful lifetime of the catalyst. In addition, the support and its dimensions influence the mechanical strength, density and reactor packing characteristics, control of which are desirable.

Alumina is a typical catalyst support material and can exist as any one or combination of crystallographic phases, or polymorphs, commonly known as transition aluminas. Transition aluminas are ubiquitous as supports and/or catalysts for many heterogeneous catalytic processes. The synthesis of the transition aluminas typically begins with the hydroxides or oxyhydroxides of aluminum, both of which are effectively hydrates of alumina. Examples of such include the naturally-occurring or synthetic aluminum hydroxides, such as aluminum trihydroxides (gibbsite, bayerite, and nordstrandite) or monohydroxides (boehmite or diaspore). Progressive dehydration and accompanying lattice rearrangement in the series of transition aluminas leads to increasingly stable and ordered materials, and culminating in all cases with alpha alumina, which is a material unsuitable for catalytic applications and that requires high surface areas. Alpha alumina is typically obtained at calcination temperatures in excess of 1,000° C. There exist preparative processes within the art that can provide for transition aluminas having any number of distinct combinations of desirable properties, e.g., particle size, surface area, pore volume and average pore diameter. Some catalytic processes within the art for which transition aluminas are employed as catalyst and/or catalyst supports subject the transition alumina to conditions of high temperature, high pressure and high water vapor pressure.

Catalytic reactions that produce water vapor of high temperature and high partial pressure create an environment that challenges the hydrothermal stability of transition alumina supports, with the supports being prone to degradation, fragmentation, or other processes that compromise the ability to effectively support catalytic metals. Finding or preparing transition alumina of sufficient hydrothermal stability for use in protracted steam-producing reactor runs remains an important problem in the art. For purposes of the present discussion, hydrothermal stability is defined as the property of resisting morphological and/or structural change in the face of elevated heat and water vapor pressure.

The Fischer-Tropsch process (also called the Fischer-Tropsch reaction or Fischer-Tropsch synthesis) is an example of a process that can generate water vapor of high partial pressure at high temperatures. The Fischer-Tropsch process comprises contacting a feed stream comprising carbon monoxide and hydrogen gases, known as synthesis gas or syngas, with a catalyst at conditions of elevated pressure and temperature to produce mixtures of hydrocarbons and by-products comprising water and carbon dioxide. Syngas can be made from the gasification of coal or, alternatively, methane found in natural gas reserves by partial oxidation with an oxygen source or by reaction with steam (steam reforming). Natural gas is typically stranded gas found with oil deposits during drilling operations. Such stranded gas presents a problem in those areas where there is no close market for this commodity because transportation of gases as compared to liquids is costly and impractical. As a result, on-site conversion of gaseous resources to easily transportable liquids represents a large potential gain in revenue. The Fischer-Tropsch process is one use of syngas and as such presents an attractive market for gas to liquids technology. It has long been recognized that syngas can be converted to liquid hydrocarbons by the catalytic hydrogenation of carbon monoxide. The general chemistry of the Fischer-Tropsch reactions are as follows:

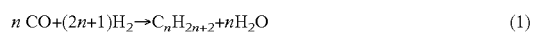

$$n\,CO + (2n+1)H_2 \rightarrow C_nH_{2n+2} + nH_2O \tag{1}$$

$$CO + H_2O \rightarrow CO_2 + H_2 \tag{2}$$

A competing reaction is often the water-gas shift reaction, equation (2), in which carbon monoxide is consumed in a reaction with water generated from equation (1), above, to form carbon dioxide ($CO_2$) and hydrogen ($H_2$). The catalytic metal used can influence the nature and composition of the mixture of products and by-products formed. For example, it is well known that iron-based Fischer-Tropsch catalysts have high water gas shift activity while cobalt-based Fischer-Tropsch catalysts have a much lower water gas shift activity.

Catalysts for the Fischer-Tropsch process typically comprise a metal selected from the group comprising cobalt, iron, ruthenium, or other Group VIIIA (according to the Previous IUPAC Form of the Periodic Table of the Elements as illustrated in, for example, the *CRC Handbook of Chemistry and Physics*, $82^{nd}$ Edition, 2001-2002, which will serve as the standard herein and throughout for all references to element group numbers in this application) metals; optionally, a cocatalyst selected from the group consisting of copper, thorium, zirconium, rhenium or titanium; and, optionally, a promoter selected from the group consisting of the alkali metals, the alkaline earths, the lanthanides, Group IIIB, IVB, VB, VIB and VIIB metals; and may be supported or unsupported. The current practice with respect to supported catalysts is to use porous, inorganic refractory oxides as the carrier. $\gamma$-$Al_2O_3$ is an example of such a carrier.

Fischer-Tropsch reactors utilizing a cobalt-based catalyst can generate significant amounts of water due to the relatively low water gas shift activity of cobalt catalysts. Under typical reactor conditions, e.g., temperatures in excess of 200° C. and pressures in excess of 20 bar, the water produced in these reactions can reach partial pressures in excess of 5 bar. Under these conditions, catalyst support particles, such as those comprising $\gamma$-$Al_2O_3$ for example, can degrade and disintegrate, causing cobalt to dislodge from the support particles and permitting for the appearance of cobalt fines in the product stream. The formation of subparticles that are in the submicron range in a product stream has multiple undesirable repercussions: 1) purification and complete removal of subparticles from the product stream tends to become quite difficult; 2) a reduced lifetime of the catalyst; 3) regeneration of recovered cobalt catalyst tends to be severely hindered; and 4) the loss of costly cobalt metal can represent a significant loss of revenue.

Other industrial processes that involve steam and consequently require catalyst supports stable to high-temperature and high-pressure steam include steam reforming, water gas shift reaction and catalytic conversion for emission control in automobiles.

Thus, there have been attempts to address the general problem of making catalyst supports that do not degrade at elevated temperatures with concomitant loss of high surface area. For example, U.S. Pat. No. 5,837,634 discloses a process for preparing a stabilized alumina that exhibits an enhanced resistance to structural degradation at high temperatures, e.g., greater than about 1,000° C. The process comprises aging an admixture of a precursor boehmite alumina and an effective amount of a stabilizer such as a water-soluble salt of a polyvalent metal at a pH of from about 3 to about 9 and at a temperature greater than about 70° C. to convert the greater portion of the alumina to a colloidal sol, wherein the colloidal sol is recovered and calcined to produce a stabilized alumina. Surface areas ($m^2$/g) were measured on these stabilized alumina powders after calcination for 3 hours at 1,200° C. and show that the addition of stabilizers results in the persistence of surface areas in about the 10 $m^2$/g to 60 $m^2$/g range.

It will be apparent to one of ordinary skill in the art that the calcination conditions employed in the '634 patent will most likely provide an alpha alumina, which is a polymorph of alumina that is not suitable for some catalytic applications.

Similarly, U.S. Pat. No. 6,262,132 B1 provides a method for reducing catalyst attrition losses in hydrocarbon synthesis processes conducted in high agitation reaction systems, in which the phrase "high agitation reaction systems" refers to slurry bubble column reactor systems and to other reaction systems wherein catalyst attrition losses resulting from fragmentation, abrasion, and other similar or related mechanisms at least approach the attrition losses experienced in slurry bubble column systems. It is disclosed that, in one aspect of the method for producing an attrition-resistant catalyst support, the catalyst support is gamma alumina including an amount of titanium effective for increasing the attrition resistance of the catalyst.

U.S. Pat. No. 6,303,531 B1 relates to hydrothermally stable, high pore volume aluminum oxide/swellable clay composites and methods for their preparation and use. The patent is based on the teachings that when active alumina is dispersed and subjected to a rehydration process in the presence of controlled amounts of a dispersed swellable clay the resulting composite particles exhibit and maintain the properties of high surface area and hydrothermal stability, wherein the properties are retained when catalytically active metal components are impregnated before or after the shaping of extrudates. It is also disclosed that the hydrothermal stability of the composite particles could be further improved by the incorporation of silicate salts therein.

Pore size and mechanical strength in $\gamma$-$Al_2O_3$ have been influenced by low temperature hydrothermal treatment of $\gamma$-$Al_2O_3$. As disclosed in *Preparation of Catalysts V*, 1991, page 155-163, wherein gamma alumina in the form of 1.5 mm extrudates was subjected to hydrothermal treatment in an autoclave in the presence of water vapor, it was found that the crushing strength was observed to increase progressively with increasing duration of heating for $\gamma$-$Al_2O_3$ hydrothermally treated at 150° C., with a considerable increase (about 65%) in the volume of 100-250 Å diameter pores. At higher temperatures, a reverse trend is noticed. X-ray diffraction analysis of the hydrothermally treated samples showed no peaks corresponding to other phases of alumina.

The problem of contamination of a Fischer-Tropsch product with catalyst ultra fines has been addressed by introducing to an untreated catalyst support a modifying component that is capable of suppressing the solubility of the catalyst support in acidic or neutral aqueous solution. The ultimate effect is that of preventing the formation of loosely bound hydrotalcite-like structures upon which the active catalytic cobalt metal can precipitate and subsequently become dislodged during extended Fischer-Tropsch reactor runs. International Application No. WO 99/42214 discloses that such catalysts have hitherto been produced by slurry impregnation of an alumina support with cobalt nitrate in acidic to neutral solution, a medium in which the alumina is partially soluble. Upon dissolution, the cobalt and aluminum ions can co-precipitate as hydrotalcite-like structures, e.g. $Co_6Al_2CO_3(OH)_{16} \cdot 4H_2O$, that are physically adsorbed and loosely bonded to the original alumina surface. Commercialization of the slurry phase Fischer-Tropsch process reveals a serious problem that can arise when such catalysts using the known untreated alumina supported cobalt catalyst are used as the wax product as they could contain relatively high amounts of attrided catalyst. Evidently, during slurry impregnation of an untreated alumina support, cobalt nitrate will deposit on the loosely bonded hydrotalcite-like structures. The cobalt on loosely bonded hydrotalcite-like structures can dislodge during extended runs and contaminate the wax product with cobalt rich ultra fines. Attempts to solve or at least alleviate this problem have included protecting the alumina support during aqueous impregnation by improving the inertness of the alumina surface.

U.S. Pat. No. 6,224,846 B1 discloses a process for making a modified boehmite alumina comprising reacting at elevated temperatures a boehmite alumina with an alkyl or aryl mono- or disulfonic acid derivative as the acid or its salt to produce a reaction mixture containing a modified boehmite alumina, with the modified boehmite alumina being recovered from the reaction mixture.

Many in the art have attempted to solve the general problems of catalyst attrition and hydrothermal stability in catalysts. However, creating a catalyst on a stabilized transition alumina support that possesses high hydrothermal stability and low attrition resistance remains a problem. In particular, creating catalysts suitable for use in Fischer-Tropsch reactors, which produce substantial quantities of water vapor at high partial pressure, remains a need within the art. Further needs include providing a stabilized transition alumina having high hydrothermal stability.

BRIEF SUMMARY OF SOME OF THE PREFERRED EMBODIMENTS

The present invention provides a method for preparing a stabilized transition alumina having enhanced hydrothermal stability. The material is particularly well suited for use as a Fischer-Tropsch catalyst support in Fischer-Tropsch reactors operating at comparatively high temperatures and generating significant amounts of water at high partial pressure.

The present invention provides, in one aspect, a stabilized transition alumina having high hydrothermal stability. More particularly, the present invention provides a stabilized transition alumina having the property of resisting structural and morphological change in the face of very high water partial pressure. The present stabilized transition alumina is particularly suitable for use as a catalyst support for use in Fischer-Tropsch catalysts that are employed in protracted Fischer-Tropsch reactions that generate very high water vapor pressure.

In another aspect of the invention, a method is provided for preparing a stabilized transition alumina to make a catalyst support. The method of making the catalyst support includes steaming a transition alumina to transform it at least partially to a boehmite material and incorporating at least one structural stabilizer into the catalyst support matrix before or after the steaming step. One embodiment of the method comprises introducing to a transition alumina at least one structural stabilizer precursor in an amount effective for delivering an amount of precursor between 0.1% and 10% by weight to provide a stabilizer-impregnated alumina; steaming the stabilizer-impregnated alumina at conditions sufficient to transform the stabilizer-impregnated alumina to a stabilizer-containing boehmite alumina; and calcining the stabilizer-containing boehmite alumina to yield a stabilized transition alumina. In an alternate embodiment of the inventive method, the method comprises steaming a transition alumina at conditions sufficient to transform the transition alumina to a boehmite alumina; introducing to the boehmite alumina at least one structural stabilizer precursor in an amount effective for delivering an amount of structural stabilizer between 0.1% and 10% by weight to provide a stabilizer-containing boehmite alumina; and calcining the stabilizer-containing boehmite alumina to yield a stabilized transition alumina.

The present invention also provides a catalyst having high hydrothermal stability and good catalyst attrition resistance with the catalyst deriving its qualities by virtue of being supported on the stabilized transition alumina of the present invention, namely one having high hydrothermal stability. The catalyst of the present invention is particularly useful, for example, in reactor environments producing water at high partial pressure and is particularly effective in converting synthesis gas under appropriate conditions of temperature and pressure to a desirable product mixture comprising hydrocarbons, such as in Fischer-Tropsch reactors in which water at high partial pressure and high temperature is produced. The catalyst of the present invention is particularly well-suited for use as a catalyst in protracted Fischer-Tropsch reactions generating significant amounts of high temperature steam in fixed bed, fluidized bed and slurry bubble column reactors.

In a further aspect of the present invention, a process is provided for making a catalyst of high hydrothermal stability and improved catalyst attrition resistance. In one aspect, the inventive process comprises introducing to a stabilized transition alumina at least one metal salt in a manner and amount effective for evenly dispersing the metal salt over the surfaces and throughout the pore structure of the stabilized transition alumina support. The stabilized transition alumina containing the deposited metal salt is preferably calcined to furnish the catalyst of the inventive method.

In another aspect, the present invention provides a process for producing hydrocarbons wherein the process comprises contacting a feed stream comprising carbon monoxide and hydrogen over a catalyst in a suitable reactor and under suitable conditions of temperature and pressure to produce a product comprising hydrocarbons and, in particular, waxy paraffinic hydrocarbons, wherein the catalyst comprises a stabilized transition alumina support and at least one catalytically active metal.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the present invention, reference will now be made to the accompanying Figures, in which.

DETAILED DESCRIPTION OF THE PREFERRED EMBODIMENTS

Figure 1:
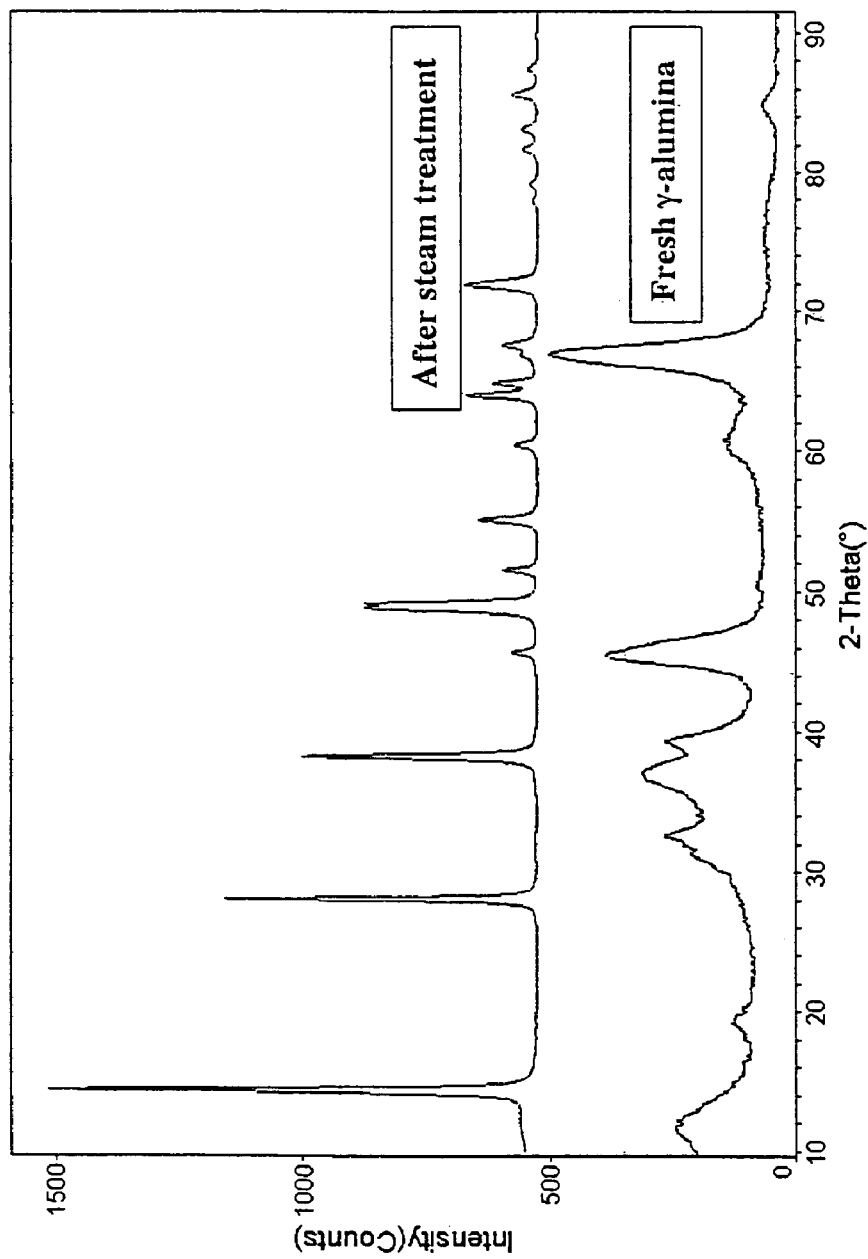
FIG. 1 illustrates a comparative X-ray diffraction (XRD) plot of an unmodified $\gamma$-$Al_2O_3$ sample both before and after treatment with saturated steam at 220° C. for 2 h.

In one aspect of the invention, a method is provided for preparing a stabilized transition alumina catalyst support. As used herein, the term stabilized transition alumina refers to an oxide of aluminum possessing a definite crystal structure corresponding to one of the transition alumina phases as indicated by an X-ray diffraction pattern that is stabilized against structural change by the presence, within the structure, of some atom found to impart such stability.

The present invention is based on the discovery that, under Fischer-Tropsch reactor conditions employing a cobalt-based catalyst supported on a transition alumina, the transition alumina is transformed to boehmite. In particular, it has been found that subjecting a catalyst comprising an active metal (cobalt) on a gamma alumina support to Fischer-Tropsch reaction conditions for about 300 hours on stream was effective in partially or completely transforming the crystal lattice structure of the transition alumina to that of boehmite alumina. Moreover, the compromised physical strength of the catalyst support leads to its disintegration and the formation of catalyst subparticles into the product stream.

Acquisition of such findings was possible only after non-standard experiments utilizing cross-sectional transmission electron microscopy (XTEM), which is a useful tool for providing both chemical and structural information about component phases in the catalyst particles. The successful XTEM experiments obviated the need for cleaning of the catalyst particles by carrying out the analysis with the waxy product in place, thereby preserving the condition of the catalyst particle and conveying useful information about the catalyst particle and the precise nature of the induced change in the face of reactor conditions.

Structural analysis revealed that the so-formed boehmite phase is a crystalline phase comprising platelet-like primary particles having dimensions of at least 10 nm.

Moreover, it has been found that subjecting a fresh catalyst comprising an active metal on a gamma alumina support to steaming conditions, namely treatment with water vapor at a temperature above 200° C. and a water partial pressure of at least 5 bar in an autoclave for 2 hours, was effective in partially or completely transforming the crystal lattice structure of the transition alumina to that of boehmite alumina. This transformation was also accompanied by a significant reduction in the surface area of the support material and an alteration of the morphology of the particle, with the physical strength of the catalyst support being severely deteriorated. This transformation resulted in the agglomeration of distinct catalytic metal sites on the surface of the catalyst support. Collectively, these factors most likely combine to reduce the efficacy of the active metal or metals in catalyzing the Fischer-Tropsch process. Hence, the tendency of transition aluminas to change phases under hydrothermal conditions makes unmodified transition alumina an inferior choice for use as a catalyst support for reactions that involve high water vapor partial pressures and high temperatures, such as Fischer-Tropsch reactions.

Though many in the art have attempted to address the issue of catalyst attrition, it has not been appreciated until now that a phase transformation from a transition alumina to boehmite was responsible for the partial reduction in catalytic activity and catalyst attrition found in protracted Fischer-Tropsch reactor runs generating high water partial pressure at high temperature.

Sequence to Make Stabilized Transition Alumina wherein Steaming Follows Impregnation An embodiment of the present invention comprises a preferred process for preparing a stabilized transition alumina catalyst support comprising the steps of introducing to a transition alumina at least one structural stabilizer precursor to provide a stabilizer-impregnated alumina. The structural stabilizer precursor can be deposited and adsorbed physically or chemically on the surface of the transition alumina. The stabilizer-impregnated alumina is steamed at conditions sufficient to at least partially transform the stabilizer-impregnated alumina into a stabilizer-containing boehmite alumina. A stabilizer-containing boehmite alumina is defined herein as a boehmite alumina that incorporates a structural stabilizer onto and/or into a boehmite alumina, wherein boehmite alumina refers to a crystalline monohydrate of the oxide of aluminum. The stabilizer-containing boehmite alumina is then calcined to produce the desired stabilized transition alumina. Transition alumina comprises any of the phases of alumina that are intermediate in order and degree of hydration between the alumina hydrates, e.g. aluminum hydroxides and oxyhydroxides and alpha alumina. Although any one or combination of transition alumina phases could be used in the present invention, the transition alumina of the present invention preferably comprises a phase selected from the group consisting of $\gamma$-$Al_2O_3$, $\delta$-$Al_2O_3$, $\theta$-$Al_2O_3$ and any combination thereof. More preferably, the transition alumina comprises a $\gamma$-$Al_2O_3$ phase. The transition alumina employed in the present invention preferably has several, and more preferably all, of the following properties: generally spherical particles; an average particle size in the range of from about 10 μm to about 250 μm (most preferably from about 40 μm to about 150 μm); a BET surface area, after calcination, in the range of from about 100 $m^2$/g to about 150 $m^2$/g; and a porosity in the range of from about 0.2 $cm^3$/g to about 0.6 $cm^3$/g.

The structural stabilizers of the present invention are introduced to a transition alumina via a structural stabilizer precursor, wherein the structural stabilizer precursor comprises a chemical compound, such as, for example, a water-soluble salt, that contains the atoms of the structural stabilizer in an oxidation state that is not zero. The function of the structural stabilizer precursor is to provide the structural stabilizer in such a form so as to facilitate its delivery into and/or onto the transition alumina. The structural stabilizer precursors that are useful in the present invention include but are not limited to water-soluble salts, such as nitrates, acetates, and organometallic salts such as acetylacetonates, and other compounds such as oxides and acids. The structural stabilizer preferably comprises at least one element selected from the group consisting of boron (B), magnesium (Mg), silicon (Si), calcium (Ca), titanium (Ti), chromium (Cr), manganese (Mn), iron (Fe), cobalt (Co), nickel (Ni), copper (Cu), zinc (Zn), gallium (Ga), strontium (Sr), zirconium (Zr), barium (Ba), selenium (Se) and the lanthanides (Lns), including lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu). More preferably, structural stabilizers comprise at least one element selected from the group consisting of boron, cobalt, zirconium, and any combination thereof. Though not wishing to be bound by any particular theory, it is believed that the structural stabilizers are effective based on the ability of the structural stabilizer atoms to occupy the sites in the transition alumina crystal lattice that can normally be occupied by the aluminum atoms. In particular, it is believed that the atoms of the structural stabilizer can fill the vacant cation sites of the transition alumina structure thereby stabilizing the transition alumina crystal lattice and rendering it resistant to atomic rearrangement and consequent transformation to boehmite during a hydrothermal treatment, such as during a Fischer-Tropsch reaction.

At least one or a combination of two or more structural stabilizers can be selected for introduction to a transition alumina using any suitable technique including impregnation, ion-exchange, grafting and/or kneading, preferably incipient wetness impregnation. The introduction of at least one structural stabilizer can be in an amount ranging from 0.1% to 20% by weight, more preferably in an amount ranging from 1% to 10% by weight, and most preferably in an amount ranging from 1% to 5% by weight.

The process may further comprise drying the stabilizer-impregnated alumina at a temperature between 50° C. and 200° C. The drying may follow the introduction of the structural stabilizer.

In addition, the process may further comprise steaming the stabilizer-impregnated alumina at conditions sufficient to transform the stabilizer-impregnated alumina into a stabilizer-containing boehmite alumina. Steaming comprises subjecting a given material, within the confines of an autoclave or other suitable device, to an atmosphere comprising a saturated or under-saturated water vapor at conditions of elevated temperature and elevated water partial pressure. Preferably, the steaming of the stabilizer-impregnated transition alumina is performed at temperatures ranging from 150° C. to 500° C., more preferably ranging from 180° C. to 300° C., and most preferably ranging from 200° C. to 250° C., at a water vapor partial pressure preferably ranging from 1 bar to 40 bar, more preferably ranging from 4 bar to 20 bar, and most preferably from 10 bar to 20 bar; and an interval of time preferably from 0.5 hour to 10 hours, and most preferably from 0.5 hour to 4 hours. Preferably, under these steaming conditions, the stabilizer-impregnated alumina is at least partially transformed to at least one phase of boehmite, pseudoboehmite and the combination thereof. A pseudoboehmite alumina refers to a monohydrate of alumina having a crystal structure corresponding to that of boehmite but having low crystallinity or ultrafine particle size.

Alternatively, the steaming of the stabilizer-impregnated alumina can comprise temperatures preferably ranging from 150° C. to 500° C., more preferably ranging from 180° C. to 300° C., and most preferably ranging from 200° C. to 250° C.; a water vapor partial pressure preferably ranging from 1 bar to 5 bar, and more preferably ranging from 2 bar to 4 bar; and an interval of time preferably from 0.5 hour to 10 hours, and most preferably 0.5 hours to 4 hours. Under these alternative steaming conditions, the stabilizer-impregnated alumina is at least partially transformed to at least one phase of boehmite, pseudoboehmite and the combination thereof.

The process can further comprise calcining the stabilizer-containing boehmite alumina. Calcination of the stabilizer-containing boehmite alumina is at temperatures between 300° C. and 1,000° C., and more preferably at temperatures between 400° C. and 900° C.

Sequence to Make Stabilized Transition Alumina wherein Impregnation Follows Steaming In an alternate embodiment, a process for preparing a stabilized transition alumina comprises steaming a transition alumina at conditions sufficient to at least partially transform the transition alumina to a boehmite alumina; introducing to the boehmite alumina at least one structural stabilizer precursor to provide a stabilizer-containing boehmite alumina; and calcining the stabilizer-containing boehmite alumina. The transition aluminas of this alternate embodiment are substantially similar to those of the above-described embodiment wherein steaming follows impregnation.

Such alternate embodiment comprises steaming a transition alumina wherein preferred conditions for steaming comprise a temperature preferably ranging from 150° C. to 500° C., more preferably ranging from 180° C. to 300° C., and most preferably ranging from 200° C. to 250° C.; a water vapor partial pressure preferably ranging from 1 bar to 40 bar, more preferably ranging from 4 bar to 20 bar, and most preferably from 10 bar to 20 bar; and an interval of time preferably from 0.5 hour to 10 hours, and most preferably 0.5 hour to 4 hours. Preferably, under these steaming conditions, the transition alumina is at least partially transformed to at least one phase of boehmite, pseudoboehmite and the combination thereof.

Alternately, steaming of the transition alumina can comprise conditions of temperature preferably ranging from 150° C. to 500° C., more preferably ranging from 180° C. to 300° C., and most preferably ranging from 200° C. to 250° C.; a water vapor partial pressure preferably ranging from 1 bar to 5 bar, and more preferably ranging from 2 bar to 4 bar; and an interval of time preferably from 0.5 hour to 10 hours, and most preferably from 0.5 hour to 4 hours. Preferably, under these steaming conditions, the transition alumina is at least partially transformed to at least one phase of boehmite, pseudoboehmite and the combination thereof.

Optionally, the material obtained after the steam treatment of the transition alumina can be calcined before impregnation at a temperature ranging from about 250° C. to about 350° C., preferably from about 300° C. to about 350° C., most preferably at about 325° C.; and a pressure from about 1 atm to about 10 atm, preferably from about 1 atm to 2 atm.

In addition, at least one or a combination of two or more structural stabilizer precursors can be introduced to the boehmite alumina using any standard technique of impregnation. The structural stabilizers are substantially similar to the one of the above-described embodiment wherein steaming follows impregnation. Preferably, the at least one structural stabilizer precursor is introduced to the boehmite alumina by incipient wetness impregnation. The introduction of at least one structural stabilizer precursor can be in an amount effective for delivering an amount of structural stabilizer ranging from 0.1% to 20% by weight, more preferably in an amount ranging from 1% to 10% by weight, and most preferably in an amount ranging from 1% to 5% by weight.

The process may further comprise drying the stabilized boehmite alumina at a temperature between 50° C. and 200° C. The drying can be carried out after introducing at least one structural stabilizer to the boehmite alumina.

The present alternate embodiment further comprises calcining the stabilizer-containing boehmite alumina. Calcination of the stabilizer-containing boehmite alumina is preferably at temperatures between 300° C. and 1,000° C., and more preferably at a temperature between 400° C. and 900° C.

Method of Making a Catalyst

An additional embodiment comprises a method of making a Fischer-Tropsch catalyst. Fischer-Tropsch catalysts can be made by the following steps: introducing at least one catalytic metal precursor to a stabilized transition alumina catalyst support to provide a catalyst-impregnated support; optionally, introducing at least one cocatalytic metal precursor to the catalyst-impregnated support to provide a cocatalyst-impregnated support; optionally, introducing at least one promoter precursor to the cocatalyst-impregnated support to provide a promoter-impregnated support; and calcining the impregnated support that results from carrying out any one or combination of these steps at conditions effective for decomposing any of the precursors used in these steps to the corresponding oxides.

The present method comprises introducing at least one catalytic metal precursor to a stabilized transition alumina catalyst support. The stabilized transition alumina catalyst support of the present method is substantially similar to that described hereinabove in connection with previous aspects of this invention.

The catalytic metal precursor of the present method comprises at least one metal, with the metal being effective for converting a reactant gas comprising synthesis gas to a product mixture comprising paraffinic hydrocarbons under suitable conditions of temperature and pressure, as in, for example, a Fischer-Tropsch process. As known to those of normal skill in the art, the catalytic metal is preferably delivered to the catalyst support in the form of a catalytic metal precursor, usually comprising the metal in a nonzero oxidation state, owing to the increased solubility of the precursor over zero-valent oxidation state metals. Preferably, the at least one catalytic metal precursor comprises cobalt, iron, ruthenium, nickel, more preferably cobalt.

The catalytic metal precursor can be added by any suitable technique including, but not limited to, incipient wetness impregnation, melt impregnation and coprecipitation. The at least one catalytic metal precursor is added in an amount sufficient for delivering an amount of catalytic metal to the stabilized transition alumina catalyst support that is preferably between 5% and 50% by weight of catalytic metal relative to the weight of the support; more preferably, between 10% and 40% by weight of catalytic metal relative to the weight of the support; and most preferably between 15% and 35% by weight of catalytic metal relative to the weight of the support.

The present method of making a Fischer-Tropsch catalyst may further comprise introducing at least one cocatalytic metal precursor to the catalyst-impregnated support to provide a cocatalyst-impregnated support. The cocatalytic metal precursor comprises at least one cocatalytic metal that is effective for increasing the efficacy of the catalytic metal in the transformation of a reactant gas mixture comprising synthesis gas to a product mixture comprising paraffinic hydrocarbons under suitable conditions of temperature and pressure. Preferably, the cocatalytic metal precursor comprises at least one metal selected from Groups IIIA, IVA, VA, VIA, VIIA, VIIIA, IB and IIB of The Periodic Table of the Elements. More preferably, the cocatalytic metal precursor comprises at least one metal selected from the group consisting of ruthenium, hafnium, cerium, copper, thorium, zirconium, rhenium and titanium. The cocatalytic metal precursor can be a soluble compound of metal salts, including, but not limited to, acetates, acetylacetonates, nitrates, halides, and the like. The cocatalytic metal precursor can be added using any known technique including, without limitation, incipient wetness impregnation, melt impregnation and coprecipitation. The cocatalytic metal precursor is added in an amount sufficient for delivering an amount of cocatalytic metal to the catalyst-impregnated support that is preferably between 0.001% and 20% by weight of cocatalytic metal relative to the weight of the support; more preferably between 0.005% and 10% by weight of cocatalytic metal relative to the weight of the support; and most preferably between 0.01% and 5% by weight of cocatalytic metal relative to the weight of the support.

In addition, the present method of making a Fischer-Tropsch catalyst may further comprise introducing at least one promoter precursor to the cocatalyst-impregnated support to provide a promoter-impregnated support. The promoter precursor of the current method comprises at least one element that is effective when present with the catalytic and/or cocatalytic metals of the present method for further increasing the efficacy of the catalytic and/or cocatalytic metals in transforming a reactant gas mixture comprising synthesis gas to a product mixture comprising paraffinic hydrocarbons under suitable conditions of temperature and pressure. The promoter precursor comprises at least one of Groups IA, IIA, IIIB, IVB, VB, VIB and VIIB; more preferably at least one of boron, palladium, platinum, silver, gold, nickel, copper, the alkali metals, the alkaline earth metals, the actinides and the lanthanides; and most preferably boron, platinum, ruthenium, or combinations thereof.

Introduction of the promoter via the promoter precursor is known to those of ordinary skill in the art wherein the promoter precursor serves as a suitable vehicle for introduction of the promoter to the cocatalyst-impregnated support. The promoter precursor can be added using any known technique including, but not limited to, incipient wetness impregnation, melt impregnation and coprecipitation. The promoter precursor is added in an amount sufficient for delivering an amount of promoter to the stabilized transition alumina catalyst support that is preferably between 0.005% and 20% by weight of promoter relative to the weight of the support; more preferably between 0.01% and 10% by weight of promoter relative to the weight of the support; and most preferably between 0.02% and 5% by weight of promoter relative to the weight of the support.

The present method for making a Fischer-Tropsch catalyst may further comprise drying the impregnated support that results from executing any one or combination of the aforementioned impregnation steps. The drying is carried out at conditions effective for removing any solvents used in introducing any one or combination of precursors to any of the supports of the present method to provide a dried impregnated support. The conditions effective for removing solvents comprise a temperature between 80° C. and 200° C. The conditions further comprise a pressure preferably between 1 atm and 10 atm; more preferably between 1 atm and 5 atm, and most preferably between 1 atm and 3 atm. The conditions still further comprise a time interval from 0.5 hours to 36 hours.

The present method for making a Fischer-Tropsch catalyst further comprises calcining any of the impregnated supports that results from carrying out any one or combination of impregnation and/or drying steps at conditions effective for decomposing any of the precursors used in the deposition steps to the corresponding oxides. Effective conditions comprise a temperature preferably between 200° C. and 500° C.; and more preferably between 300° C. and 400° C. Effective conditions further comprise a pressure preferably between 1 atm and 10 atm, more preferably between 1 atm and 5 atm, and most preferably 1 atm.

In alternative embodiments, the catalyst precursor, cocatalyst precursor and/or promoter precursor can be introduced to the stabilized transition alumina support more than once. In addition, any one or any combination of the deposition, drying and/or calcination steps can be executed more than once. For example, deposition of a catalyst precursor, a cocatalyst precursor and a promoter precursor on the stabilized transition alumina support can proceed by multistep impregnation, such as by two, three, or four deposition steps. Moreover, any deposition, drying or calcination step can be followed by any other, or the same, deposition, drying or calcination step. It will be further noted that any deposition step can be executed concurrently with any other or combination of deposition steps. Any sequence of deposition, drying, and/or calcination steps is also permissible according to the present method.

A Fischer-Tropsch Catalyst

In a further embodiment of the present invention, a Fischer-Tropsch catalyst comprises a stabilized transition alumina catalyst support; at least one catalytic metal; optionally, at least one cocatalytic metal; and optionally, at least one promoter element. A Fischer-Tropsch catalyst is defined herein as a catalyst effective for at least partially transforming a reactant gas mixture comprising synthesis gas to a product mixture comprising hydrocarbons under suitable conditions of temperature and pressure and in a suitable reactor.

The present Fischer-Tropsch catalyst comprises a stabilized transition alumina catalyst support. The support is substantially similar to the stabilized transition alumina catalyst support described hereinabove in connection with other aspects of this invention.

The Fischer-Tropsch catalyst further comprises at least one catalytic metal, the function of which has been elucidated in connection with other aspects of this invention. Preferably, the metal is selected from cobalt, iron, ruthenium, and nickel; more preferably the metal is cobalt. The catalytic metal of the present Fischer-Tropsch catalyst is preferably present in an amount between 5% and 50% by weight of said metal relative to the weight of the catalyst support; more preferably, present in an amount between 10% and 40% by weight of said metal relative to the weight of the catalyst support; and most preferably present in said catalyst in an amount between 15% and 35% by weight of said metal relative to the weight of the catalyst support.

The Fischer-Tropsch catalyst further comprises at least one cocatalytic metal, wherein the function of which has been elucidated in connection with other aspects of the current invention. Preferably, the at least one cocatalytic metal is selected from Groups IIIA, IVA, VA, VIA, VIIA, VIIIA, IB and IIB. More preferably, the at least one cocatalytic metal comprises at least one metal selected from the group consisting of ruthenium, hafnium, cerium, copper, thorium, zirconium, rhenium and titanium. The cocatalytic metal is present in the catalyst in an amount preferably between 0.001% and 20% by weight of the metal relative to the weight of the catalyst support; more preferably between 0.005% and 10% by weight of the metal relative to the weight of the catalyst support; and most preferably between 0.01% and 5% by weight of cocatalytic metal relative to the weight of the catalyst support.

The Fischer-Tropsch catalyst further comprises a promoter, wherein the function of which has been elucidated in connection with other aspects of the current invention. Preferably, the promoter comprises at least one element of Groups IA, IIA, IIIB, IVB, VB, VIB and VIIB; more preferably at least one of boron, palladium, platinum, silver, gold, nickel, copper, the alkali metals, the alkaline earth metals, the actinides and the lanthanides; and most preferably boron. The promoter is present in an amount preferably between 0.005% and 20% by weight of promoter relative to the weight of the support; more preferably between 0.01% and 10% by weight of promoter relative to the weight of the support; and most preferably between 0.02% and 5% by weight of promoter relative to the weight of the support.

Another embodiment comprises the Fischer-Tropsch catalyst used as the catalyst in a Fischer-Tropsch process, wherein the process comprises contacting a reactant gas mixture comprising synthesis gas with a catalyst under conditions and in a reactor effective for at least partially transforming the synthesis gas to a product mixture comprising paraffinic hydrocarbons, and wherein the catalyst is particularly effective for producing a product mixture comprising waxy paraffinic hydrocarbons and producing water at high partial pressure.

In such an embodiment comprising the Fischer-Tropsch catalyst used as the catalyst in a Fischer-Tropsch process, the Fischer-Tropsch catalyst comprises a stabilized transition alumina support and demonstrates an attrition resistance that is improved when compared to a similar catalyst used in a similar process, wherein the similar catalyst does not comprise a stabilized transition alumina as support. As used herein, attrition resistance will be defined as the resistance to a loss of catalytically active metal sites through various processes that may include, but are not limited to, sintering, deactivation, carbon deposition, crystallite dislodging, and poisoning. The Fischer-Tropsch catalyst of the present invention is designed to deliver superior catalyst performance under hydrothermal conditions for prolonged time periods by its resistance to loss of catalytically active metal sites through processes such as deactivation, dislodging of crystallites and sintering. The Fischer-Tropsch catalyst further demonstrates a hydrothermal stability that is improved when compared to a similar catalyst used in a similar process, wherein the similar catalyst does not comprise a stabilized transition alumina as support. As used herein, hydrothermal stability is defined as a resistance to deformation of morphology or structure under steam at a temperature no less than 150° C. and a water partial pressure no less than 2 bar.

Typically, at least a portion of the metal(s) of the catalytic metal component of the catalysts of the present invention is present in a reduced state (i.e., in the metallic state). Therefore, it is advantageous to activate the catalyst prior to use by a reduction treatment in the presence of a reducing gas at an elevated temperature. The reducing gas preferably includes hydrogen or a hydrogen-rich gas. Typically, the catalyst is treated with hydrogen at a temperature in the range of from about 75° C. to about 500° C., for about 0.5 to about 36 hours, and at a pressure of about 1 to about 75 atm. Pure hydrogen can be used in the reduction treatment, as may a mixture of hydrogen and an inert gas such as nitrogen, or a mixture of hydrogen and other gases as are known in the art, such as carbon monoxide and carbon dioxide. Reduction with pure hydrogen and reduction with a mixture of hydrogen and carbon monoxide are preferred. The amount of hydrogen may range from about 1% to about 100% by volume.

Process for Producing Hydrocarbons

In another embodiment, the Fischer-Tropsch catalyst can be used for producing a product mixture comprising paraffinic hydrocarbons. The process comprises contacting a reactant gas mixture comprising synthesis gas with a catalyst under conditions and in a reactor effective for at least partially transforming the synthesis gas to a product mixture comprising paraffinic hydrocarbons wherein the catalyst comprises a stabilized transition alumina catalyst support; at least one catalytic metal; optionally, at least one cocatalytic metal; and optionally, at least one promoter.

The process comprises contacting a reactant gas mixture comprising synthesis gas with a catalyst. The reactant gas mixture of the present process for producing hydrocarbons comprises synthesis gas having hydrogen and carbon monoxide. Synthesis gas suitable as a feedstock for conversion to hydrocarbons according to the process of this invention can be obtained from any source known to those skilled in the art, including, for example, from conversion of natural gas or light hydrocarbons of five carbons atoms or less by steam reforming, dry ($CO_2$) reforming, auto-thermal reforming, advanced gas heated reforming, partial oxidation, catalytic partial oxidation, or other processes known in the art; or from coal by gasification; or from biomass. In addition, the feed gases can comprise off-gas recycle from the present or another Fischer-Tropsch process. It is preferred that the molar ratio of hydrogen to carbon monoxide in the feed be greater than 0.5:1 (e.g., from about 0.67 to about 2.5). Preferably, when cobalt, nickel, and/or ruthenium catalysts are used, the feed gas stream contains hydrogen and carbon monoxide in a molar ratio of about 1.6:1 to about 2.3:1. Preferably, when iron catalysts are used, the feed gas stream contains hydrogen and carbon monoxide in a molar ratio between about 1.4:1 and about 2.3:1. The feed gas can also contain carbon dioxide. The feed gas stream should contain only a low concentration of compounds or elements that have a deleterious effect on the catalyst, such as poisons. For example, the feed gas may need to be pretreated to ensure that it contains low concentrations of sulfur or nitrogen compounds such as hydrogen sulfide, hydrogen cyanide, ammonia and carbonyl sulfides.

The process further comprises contacting a reactant gas mixture with a catalyst in a reactor effective for at least partially transforming the synthesis gas to a product mixture comprising paraffinic hydrocarbons. Effective reactors include mechanical arrangements of conventional design such as, but not limited to, for example, continuous stirred tank, fixed bed, fluidized bed, slurry phase, slurry bubble column, reactive distillation column, or ebulliating bed reactors. Fluidized bed, reactive distillation, ebulliating bed, and continuous stirred tank reactors have been delineated in "Chemical Reaction Engineering," by Octave Levenspiel, and are known in the art, as are slurry bubble column reactors. A preferred slurry bubble column is described in co-pending commonly assigned U.S. patent application Ser. No. 10/193,357, hereby incorporated herein by reference. Accordingly, the preferred size and physical form of the catalyst particles may vary depending on the reactor in which they are to be used.

When the effective reactor of the present process includes a slurry bubble column, the column preferably includes a three-phase slurry. Further, the present process, when conducted in a slurry bubble column, preferably includes dispersing the particles of the catalyst in a liquid phase comprising the hydrocarbons to form a two-phase slurry and dispersing the hydrogen and carbon monoxide in the two-phase slurry to form the three-phase slurry. Further, the slurry bubble column preferably includes a vertical reactor and dispersal preferably includes injection and distribution in the bottom half of the reactor. Alternatively, dispersal may occur in any suitable alternative manner, such as by injection and distribution in the top half of the reactor.

The Fischer-Tropsch process is typically run in a continuous mode. In this mode, the gas hourly space velocity through the reaction zone typically can range from about 50 to about 10,000 $hr^{-1}$, preferably from about 300 $hr^{-1}$ to about 2,000 $hr^{-1}$. The gas hourly space velocity is defined as the volume of reactants per time per reaction zone volume. The volume of reactant gases is at standard conditions of pressure (101 kPa) and temperature (0° C.). The reaction zone volume is defined by the portion of the reaction vessel volume where the reaction takes place and which is occupied by a gaseous phase comprising reactants, products and/or inerts; a liquid phase comprising liquid/wax products and/or other liquids; and a solid phase comprising catalyst. The reaction zone temperature is typically in the range from about 160° C. to about 300° C. Preferably, the reaction zone is operated at conversion promoting conditions at temperatures from about 190° C. to about 260° C.; more preferably from about 205° C. to about 230° C. The reaction zone pressure is typically in the range of about 80 psia (552 kPa) to about 1,000 psia (6,895 kPa), more preferably from 80 psia (552 kPa) to about 800 psia (5,515 kPa), and still more preferably, from about 140 psia (965 kPa) to about 750 psia (5,170 kPa). Most preferably, the reaction zone pressure is from about 250 psia (1,720 kPa) to about 650 psia (4,480 kPa).

The products resulting from the process will have a great range of molecular weights. Typically, the carbon number range of the product hydrocarbons will start at methane and continue to about 50 to 100 carbons or more per molecule as measured by current analytical techniques. The process is particularly useful for making hydrocarbons having five or more carbon atoms, especially when the above-referenced preferred space velocity, temperature and pressure ranges are employed. Preferably, the present process is effective for producing a product wherein the alpha value for the Anderson-Schultz-Flory plot is at least 0.85. In addition, the present process is effective for producing a product comprising primarily hydrocarbons of at least 5 carbon atoms. The present process is effective, within a fixed bed reactor operating at a temperature of at least 200° C. and a pressure of at least 340 psig (2,440 kPa), for converting at least 70% of the carbon monoxide present in the synthesis gas to a product comprising paraffinic hydrocarbons after at least 96 hours of operation. The present process is further effective, within a fixed bed reactor operating at a temperature of at least 200° C. and a pressure of at least 340 psig (2,440 kPa), for producing at least 700 grams of $C_{5+}$ product per hour per kilogram of catalyst after at least 96 hours of operation.

Though not wishing to be bound by any particular theory, it is believed that the structural stabilizers are effective in their ability to impart enhanced hydrothermal stability and improved attrition resistance to the Fischer-Tropsch catalysts comprising the stabilized transition alumina supports of the present invention based on the ability of the structural stabilizer atoms to occupy the sites in the transition alumina crystal lattice that can normally be occupied by the aluminum atoms. In particular, though not wishing to be bound by any particular theory, it is believed that the atoms of the structural stabilizer can fill the vacant cation sites of the transition alumina crystal lattice, thereby stabilizing the transition alumina crystal lattice and rendering it resistant to phase transformation.

To further illustrate various illustrative embodiments of the present invention, the following examples are provided.

EXAMPLES

Evaluation of the hydrothermal stability of the stabilized transition alumina of the present invention was carried out by steam testing using gamma alumina, a preferred transition alumina. Steaming experiments were designed for the purpose of identifying changes in structure and morphology of the stabilized transition alumina in the presence of high partial pressure steam. Steaming tests were carried out in an autoclave operated at varying conditions of water vapor partial pressure, temperature and time interval. Pore size analysis before and after steaming was used to classify the structural stabilizers according to their ability to impart high hydrothermal stability. The methods used to characterize the stabilized gamma alumina before and after steam testing include: the change in BET surface area ($m^2/g$), the change in pore volume (total volume occupied by pores/total volume of particle), the change in pore diameter (nm) and comparison of X-ray diffraction (XRD) data.

Example 1

Figure 2:
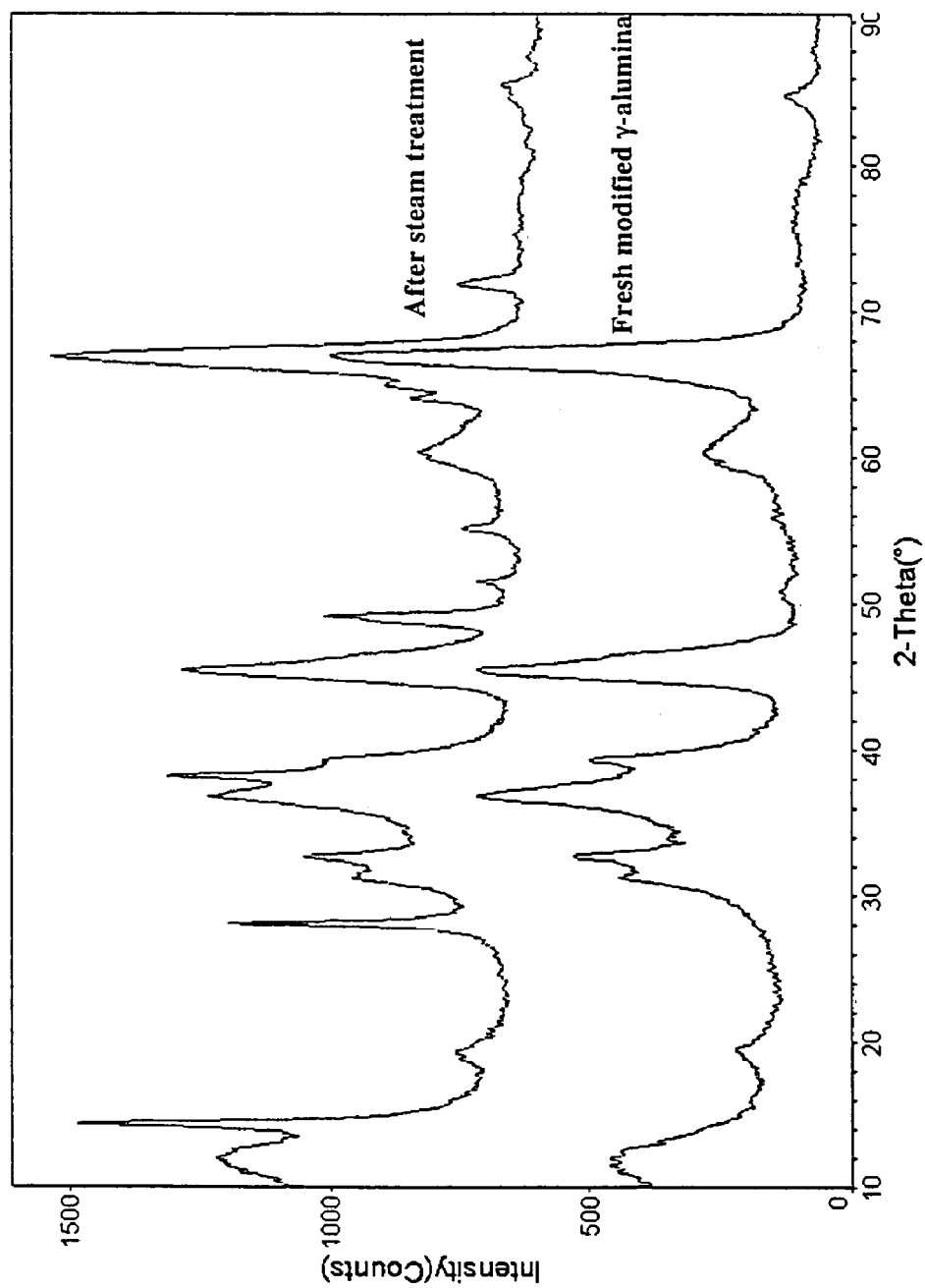
FIG. 2 illustrates a comparative XRD plot of a 2% Co stabilized transition alumina sample both before and after treatment with saturated water vapor at 220° C. for 2 h.

Stabilized Transition Alumina wherin Steaming Follows Impregnation 5 g of gamma alumina from Condea Vista was impregnated with an aqueous solution of 0.5 grams of cobalt nitrate hexahydrate [$Co(NO_3)_2.6H_2O$], (2% Co by weight), using the technique of incipient wetness impregnation. The stabilizer-impregnated alumina was dried at a temperature of 80° C. for 16 hours, and further calcined at 300° C. for 2 hours. The calcined stabilizer-impregnated alumina was charged to a Parr autoclave and treated at conditions sufficient to create an effective partial water vapor pressure of 20 bar, with 15 g of water heated at 220° C. for 2 hours. The resulting stabilizer-containing boehmite alumina was collected and calcined at a temperature of 750° C. for 5 hours to produce a stabilized transition alumina. Physical analyses were carried out on the stabilized crystal lattice-modified alumina both before and after steam testing, wherein the samples were steam tested at a steam pressure of about 15 bar and a temperature of 225° C. for 2 hours time. The results are shown in Table 1. XRD results of this cobalt-modified alumina before and after steam treatment are shown in FIG. 2.

Example 2

Stabilized Transition Alumina wherein Steaming Follows Impregnation 5 g of gamma alumina from Condea Vista was impregnated with an aqueous solution of 0.25 grams of zirconyl nitrate hydrate [$(ZrO(NO_3)_2.xH_2O$], equivalent to 2% Zr by weight in the stabilized alumina, using the technique of incipient wetness impregnation. The stabilizer-impregnated $\gamma$-$Al_2O_3$ was dried at 80° C. for 16 hours and further calcined at 300° C. for 2 hours. The calcined stabilizer-impregnated $\gamma$-$Al_2O_3$ was charged to a Parr autoclave with 15 g of water and heated at 220° C. for 2 hours; conditions sufficient to create an effective partial water vapor pressure of 20 bar. The resulting stabilizer-containing boehmite alumina was collected and calcined at a temperature of 750° C. for 5 hours to afford a stabilized transition alumina. Physical analyses were carried out on the stabilized crystal lattice-modified alumina both before and after steam testing as described in EXAMPLE 1. The results are shown in Table 1.

Example 3

Catalyst Made From Stabilized Transition Alumina 10 g of $\gamma$-$Al_2O_3$ from Condea Vista and 7.5 g water were charged to a Parr autoclave and heated at 220° C. for 2 hours; conditions sufficient to create an effective partial water vapor pressure of 10 bar. The resulting boehmite alumina was collected and impregnated with an aqueous solution of 0.9876 grams of cobalt nitrate hexahydrate [$Co(NO_3)_2.6H_2O$], equivalent to 2% Co by weight in the stabilized alumina, using the technique of incipient wetness impregnation. The stabilizer-impregnated boehmite alumina was then dried at 80° C. for 16 hours and further calcined at a temperature of 750° C. for 5 hours to afford a stabilized transition alumina. The transition alumina was impregnated with a solution containing cobalt nitrate hexahydrate [$Co(NO_3)_2.6H_2O$], a ruthenium salt, and boric acid using the technique of incipient wetness impregnation. The stabilized transition alumina impregnated with the promoters was calcined at a temperature of 300° C. for hours. The calcined transition alumina containing the promoters was subjected twice more to the sequence of impregnation and calcination to give a catalyst containing 20% Co, 0.1% Ru and 0.5% B by weight. Physical analyses were carried out on the catalyst both before and after steam testing. Physical analyses were carried out on the stabilized transition alumina both before and after steam testing as described in EXAMPLE 1. The results are shown in Table 1.

Example 4

Steaming of Transistion Alumina 5 grams of $\gamma$-$Al_2O_3$ from Condea Vista and 15 grams water were charged to a Parr autoclave and heated at 220° C. for 2 hours, with conditions sufficient to create an effective partial water vapor pressure of 20 bar. Physical analyses were carried out on the transition alumina both before and after steam testing as described in EXAMPLE 1. The results are shown in Table 1.

Figure 3:
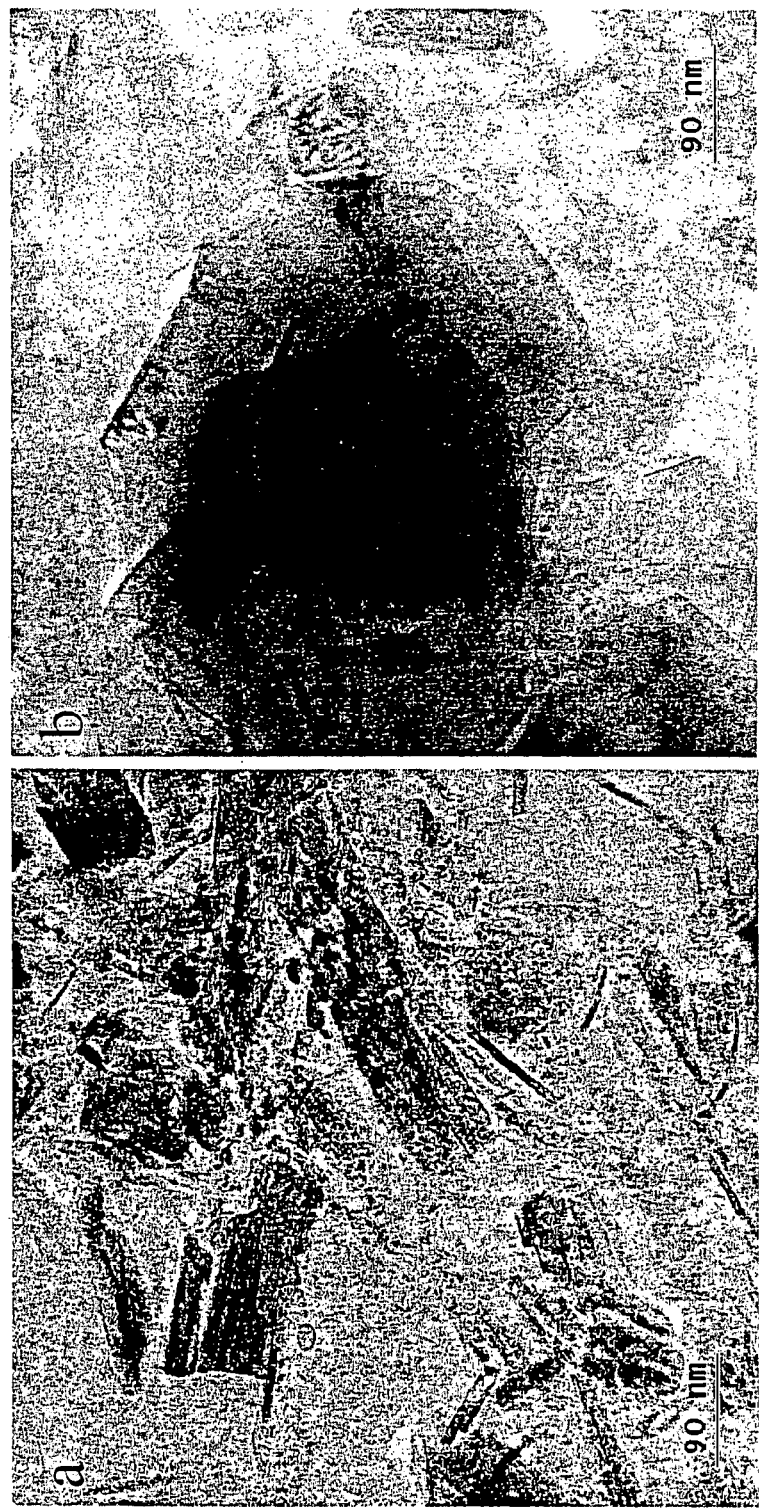
FIG. 3 illustrates transmission electron micrographs (TEM) of unmodifed $\gamma$-$Al_2O_3$ after treatment with steam at 220° C.

Table 1 shows the changes in surface area, pore volume and pore diameter for the stabilized transition alumina of EXAMPLES 1 through 3 and the transition alumina before and after steam testing. XRD results of this as-received alumina before and after steam treatment are shown in FIG. 1. Two TEM images of the steam treated alumina are shown in FIG. 3.

It is evident that the catalyst made from a stabilized transition alumina made according to EXAMPLE 3 and the stabilized transition aluminas of EXAMPLES 1 and 2 show superior results with respect to the degree of change in the cited properties. In particular, the percentage change in BET surface area, pore volume and pore diameter are greatly reduced compared to the Condea control that has no structural stabilizers. The comparative XRD results in FIG. 1 show that the unmodified gamma alumina was completely transformed to boehmite under a steam treatment with saturated steam at 220° C. for 2 hours. In FIG. 2, the fresh cobalt-modified alumina shows a XRD pattern of gamma alumina. The XRD pattern of cobalt-modified alumina after the same steam treatment as for unmodified alumina shows a boehmite pattern superimposed on gamma alumina pattern. This indicates that only part of the cobalt-modified gamma alumina was transformed to boehmite. In FIG. 3, TEM observation of the steam treated unmodified alumina shows the morphology of large platelet-like boehmite crystals, which was converted from gamma-alumina with a primary crystal size of about ~5 nm.

TABLE 1

Comparative Analysis Data for Stabilized
Transition Alumina Before and After Steaming

| Ex. # | BET Surface Area (m²/g) | | | Pore Volume | | | Pore Diameter (nm) | | |
|---|---|---|---|---|---|---|---|---|---|
| | Before | After | Δ (%) | Before | After | Δ (%) | Before | After | Δ (%) |
| 1 | 72 | 82 | 14 | 0.44 | 0.43 | −2.3 | 25 | 21 | −16 |
| 2 | 97 | 54 | −44 | 0.45 | 0.35 | −22 | 4 | 21 | 50 |
| 3 | 128 | 112 | −13 | 0.43 | 0.46 | 7 | 14 | 16 | 19 |
| 4 | 132 | 39 | −70 | 0.48 | 0.12 | −75 | | | |

Example 5

Cross-Sectional Transmission Electron Microscopy (XTEM) Analysis of Spent FT Catalyst Supported on Gamma-Alumina The present invention is based on the discovery that under Fischer-Tropsch reactor conditions employing a cobalt-based catalyst supported on an unmodified gamma-alumina support, the unmodified gamma-alumina was transformed to boehmite. In particular, it has been found that subjecting a catalyst comprising 20% cobalt and 1.5% rhenium on a gamma alumina support to reaction conditions of 220° C., 350 psig, a synthesis gas comprising hydrogen-to-CO molar ratio of 2:1, and a weight hourly space velocity of 6 NL/hr/g catalyst, for about 300 hours was effective in partially or completely transforming the crystal lattice structure of the gamma-alumina to that of boehmite alumina. This transformation is illustrated in FIG. 4.

Figure 4:
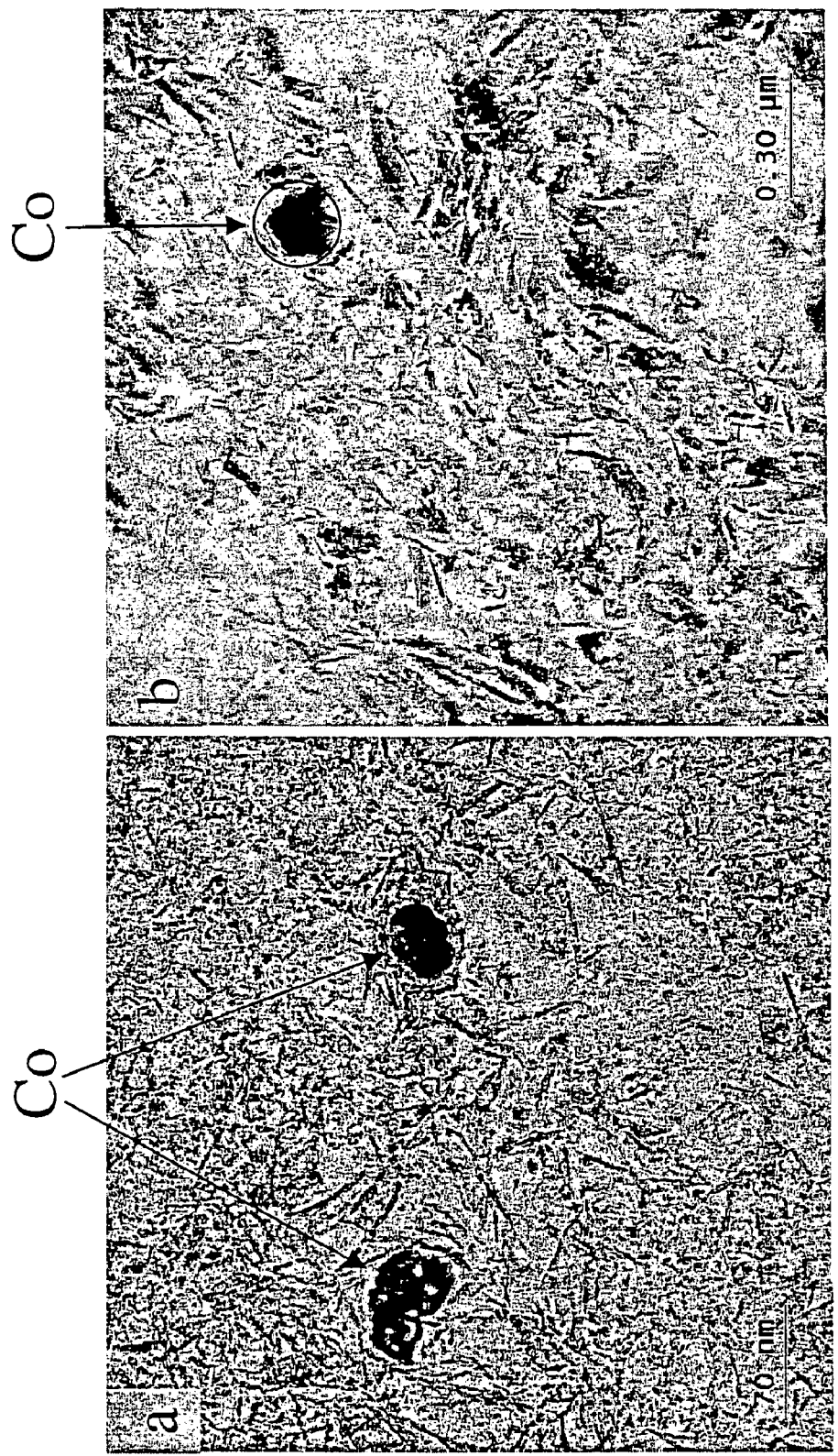
FIG. 4 illustrates cross-sectional transmission electron micrographs (XTEM) of a Co catalyst on an unmodified $Al_2O_3$ showing the change in metals dispersion after being subjecting to Fischer-Tropsch reaction conditions.

Acquisition of the data as shown in FIG. 4 was possible only after nonstandard experiments utilizing cross-sectional transmission electron microscopy (XTEM), which is a useful tool for providing both chemical and structural information about component phases in the catalyst particles. The experiments were successfully carried out only after a great deal of parameter optimization. Previous attempts to characterize catalyst particles post-reaction have been heretofore hindered by the impossibility of obtaining clean samples of the catalyst particles since it is typically difficult to completely remove the waxy product from the highly porous catalyst particles without further altering the morphology and/or chemical nature of the catalyst particles in some way. The successful XTEM experiments obviated the need for cleaning of the catalyst particles by carrying out the analysis with the waxy product in place, thereby preserving the condition of the catalyst particle and conveying useful information about the catalyst particle and the precise nature of the induced change in the face of reactor conditions.

Illustration (a) of FIG. 4 is a XTEM image of an area with gamma alumina support, shown as fine particles, that is partially transformed to boehmite, shown as large needle-like particles. It is shown that metallic cobalt particles agglomerate to have formed particles of ~40 nm in size. Illustration (b) of FIG. 4 is a TEM image of another area with a more severe extent of gamma-boehmite transformation. It is shown that boehmite exists as large platelet-like particles, and metallic cobalt particles agglomerate to form a particle of 100 nm in size. It is clear that the transformation of gamma-alumina to boehmite was accompanied by a significant reduction in the surface area of the support material and an alteration of the morphology of the particle, with the physical strength of the catalyst support being severely deteriorated. This transformation resulted in the agglomeration of distinct catalytic metal sites on the surface of the catalyst support. Collectively, these factors probably combined to reduce the efficacy of the active metal or metals in catalyzing the Fischer-Tropsch process.

Moreover, the compromised physical strength of the catalyst support led to its disintegration and the formation of catalyst subparticles into the product stream.

Structural analysis revealed that the so-formed boehmite phase was a crystalline phase comprising platelet-like primary particles having dimensions of at least 10 nm. It was observed that unmodified gamma-alumina employed in an operating Fischer-Tropsch reactor collapsed resulting in loss of surface area, an effective reduction in the number of catalytic sites, and a disintegration of catalyst particles, which are all factors contributing to the reduced attractiveness of this support in Fischer-Tropsch reactions. Hence, it is believed that the tendency of transition (and particularly gamma-alumina) to change phases under hydrothermal conditions makes unmodified or unstabilized transition alumina an inferior choice for use as a catalyst support for reactions that involve high water vapor partial pressures and high temperatures, such as Fischer-Tropsch reactions.

Example 6

Fixed Bed Reactivity Testing

A 1-g sample of the catalyst from Example 3 was packed into a fixed bed tube test reactor and reduced for 16 hours under a flow of 200 standard cubic centimeters per minute (sccm) of a gas comprising equimolar amounts of hydrogen and nitrogen. The reactor is heated to 220° C. and pressurized to 345 psig and a flow of synthesis gas (2:1 $H_2$:CO) at a space velocity of 6 L/h/g was introduced to the reactor for 24 hours. The paraffinic hydrocarbon products were collected and the degree of CO conversion, the alpha value, the $C_5^+$ productivity, and the $C_1$ selectivity, were measured and calculated. The results are shown as in Table 2. The test was carried out up to 96 hours and the results are shown in Table 2.

TABLE 2

Reactivity Testing Using 20% Co/0.1% Ru/0.5% B on Stabilized
Transition Alumina in a Fixed Bed Test Reactor

| Time (hrs) | T (° C.) | P (psig) | CO Conv | Alpha | $C_5^+$ (g/h/kg cat) | $C_1$ (wt %) |
|---|---|---|---|---|---|---|
| 24 | 221 | 344 | 80.8 | 0.88 | 823.0 | 7.9 |
| 48 | 220 | 345 | 74.5 | 0.89 | 755.1 | 8.3 |
| 72 | 220 | 345 | 72.2 | 0.89 | 731.4 | 8.4 |
| 96 | 220 | 346 | 70.3 | 0.89 | 711.4 | 8.5 |

The following patent applications filed concurrently herewith are hereby incorporated herein by reference: U.S. patent application Ser. No. 10/687,017, entitled "High Hydrotheral Stability Catalyst Support", published as U.S. Pre-Grant Patent Application Publication No. 2004-0127352; U.S. patent application Ser. No. 10/687,022, entitled "Fischer-Tropsch Processes and Catalysts Made From a Material Comprising Boebmite", now issued as U.S. Pat. No. 7,012,104; and U.S. patent application No. 10/687,022, entitled "Fischer-Tropsch Processes and Catalysts Using Stabilized Supports", now issued as U.S. Pat. No. 7,071,239.

Should the disclosure of any of the patents, patent applications, and publications that are incorporated herein conflict with the present specification to the extent that it might render a term unclear, the present specification shall take precedence.

As used herein, the term "about" or "approximately," when preceding a numerical value, has its usual meaning and also includes the range of normal measurement variations that is customary with laboratory instruments that are commonly used in this field of endeavor (e.g., weight, temperature or pressure measuring devices), preferably within ±10% of the stated numerical value.

Although the foregoing description and examples illustrate selected embodiments of the present invention, it will be noted that variations and modifications will be suggested to one skilled in the art, all of which are in the spirit and purview of this invention. Moreover, no inference or conclusion should be drawn that limits the scope of this invention. For example, it will be noted that when used for making a catalyst support the present stabilized transition aluminas need not be limited to supports for catalysts used in Fischer-Tropsch reactions. The present method is not limited to an alumina obtained from any particular vendor. One of normal skill in the art will further appreciate that the present group of structural stabilizers can be expanded to comprise any group of structural stabilizers that will improve hydrothermal stability of transition aluminas. It will be further appreciated that any suitable method can be used to introduce the structural stabilizer onto or into the alumina support. The pressures and temperatures employed for drying, steaming and calcining in the present method are preferred but it will be appreciated that other suitable sets of conditions may serve equally well. Furthermore, the description or recitation of steps is not to be construed as a requirement that those steps be carried out in the order described or recited. It will be noted that the method disclosed herein can be used to make a catalyst for which the final use is not necessarily a Fischer-Tropsch process. Indeed, the inventive process may be used to make catalysts for any given process within or outside of the petrochemical industry including, but not limited to, automotive catalysis, hydrogenation, ammonia synthesis, acetoxylation, alkylation, ammonolysis, ammoxidation, carbonylation, alcohol dehydration, dehydrochlorination, dehydrogenation, epoxidation, hydration, hydrochlorination, oxidation, oxychlorination, catalytic reforming, hydroprocessing, hydrotreating, hydrocracking, isomerization, oligomerization, fluid catalytic cracking, steam reforming, water gas shift, naphtha steam reforming and methanol synthesis. For example, it will be noted that when used for making a catalyst support the present stabilized transition aluminas need not be limited to supports for catalysts used in Fischer-Tropsch reactions. The pressures and temperatures of the Fischer-Tropsch reactions carried out here are purely illustrative and it will be understood that any combination of conditions sufficient for converting synthesis gas to hydrocarbons may be employed.

What is claimed is:

1. A method of making a stabilized transition alumina catalyst support comprising:
    (a) introducing by impregnation at least one structural stabilizer precursor to a transition alumina comprising a phase selected from the group consisting of $\gamma$-$Al_2O_3$, $\delta$-$Al_2O_3$, $\theta$-$Al_2O_3$ and any combination thereof, to provide a stabilizer-impregnated alumina; and
    (b) optionally, drying the stabilizer-impregnated alumina;
    (c) steaming the stabilizer-impregnated alumina at conditions sufficient to at least partially transform the stabilizer-impregnated alumina to at least one phase selected from the group consisting of boehmite, pseudoboehmite, and combination thereof and to form a stabilizer-containing boehmite alumina, wherein said sufficient conditions comprise a temperature between 180° C. and 300° C.; and
    (d) calcining the stabilizer-containing boehmite alumina at a temperature between 400° C. and 900° C. to form a stabilized transition alumina catalyst support comprising a $\gamma$-$Al_2O_3$ phase and a pore volume from 0.2 $cm^3$/g to 0.6 $cm^3$/g.

2. The method according to claim 1 further comprising calcining the boehmite alumina before the steaming step (c) at a temperature ranging from about 250° C. to about 350° C.

3. The method according to claim 1 wherein the at least one structural stabilizer precursor comprises cobalt.

4. The method according to claim 1 wherein the at least one structural stabilizer precursor comprises zirconium.

5. The method according to claim 1 wherein the steaming step (c) is carried out for an interval of time from 0.5 hour to 4 hours.

6. A method of making a stabilized transition alumina catalyst support comprising:
    (a) steaming a transition alumina comprising a phase selected from the group consisting of $\gamma$-$Al_2O_3$, $\delta$-$Al_2O_3$, $\theta$-$Al_2O_3$ and any combination thereof, said steaming being carried out at conditions sufficient to at least partially transform the transition alumina to at least one phase selected from the group consisting of boehmite, pseudoboebmite and combination thereof, and to form a boehmite alumina, wherein said sufficient conditions comprise a temperature between 180° C. and 300° C.;
    (b) introducing by impregnation to the boehmite alumina at least one structural stabilizer precursor to provide a stabilizer-containing boehmite alumina;
    (c) optionally, drying the stabilizer-containing boebmite alumina; and
    (d) calcining the stabilizer-containing boebmite alumina at a temperature between 400° C. and 900° C. to form a stabilized transition alumina catalyst support, said stabilized transition alumina catalyst support comprising a $\gamma$-$Al_2O_3$ phase and a pore volume ranging from 0.2 $cm^3$/g to 0.6 $cm^3$/g.

7. The method according to claim 6 wherein the transition alumina comprises a $\gamma$-$Al_2O_3$ phase.

8. The method according to claim 6 wherein the stabilized transition alumina further comprises $\delta$-$Al_2O_3$, $\theta$-$Al_2O_3$ or any combination thereof.

9. The method according to claim 6 wherein the sufficient conditions of step (a) comprise a water vapor partial pressure between 1 bar and 5 bars.

10. The method according to claim 6 wherein the sufficient conditions of step (a) comprise a water vapor partial pressure between 2 bars and 4 bars.

11. The method according to claim 6 wherein the sufficient conditions of step (a) comprise a water vapor partial pressure between 1 bar and 5 bar; and an interval of time between 0.5 hours and 10 hours.

12. The method according to claim 6 wherein the at least one structural stabilizer precursor comprises at least one element selected from the group consisting of boron, magnesium, silicon, calcium, titanium, chromium, manganese, iron, cobalt, nickel, copper, zinc, gallium, strontium, zirconium, barium, selenium and the lanthanides, including lanthanum, cerium, praseodymium, neodymium, promethium, samarium, europium, gadolinium, terbium, dysprosium, holmium, erbium, thulium, ytterbium and lutetium.

13. The method according to claim 6 wherein the at least one structural stabilizer precursor comprises at least one element selected from the group consisting of boron, cobalt, zirconium, and combinations thereof.

14. The method according to claim 6 wherein at least two structural stabilizer precursors are introduced to a boehmite alumina.

15. The method according to claim 6 wherein the at least one structural stabilizer precursor is introduced in a manner and an amount effective for delivering an amount of structural stabilizer precursor between 0.1% and 20% by weight of structural stabilizer precursor relative to a final weight of the stabilized transition alumina.

16. The method according to claim 6 wherein the at least one structural stabilizer precursor is introduced in a manner and an amount effective for delivering an amount of structural stabilizer precursor between 1% and 10% by weight of structural stabilizer precursor relative to a final weight of a stabilized transition alumina.

17. The method according to claim 6 wherein the at least one structural stabilizer precursor is introduced in a manner and an amount effective for delivering an amount of structural stabilizer precursor between 1% and 5% by weight of structural stabilizer precursor relative to a final weight of the stabilized transition alumina.

18. The method according to claim 6 wherein the method includes step (c), and wherein step (c) comprises a temperature between 50° C. and 200° C.

19. The method according to claim 18 wherein step (d) is executed after step (b).

20. The method according to claim 6 wherein the steaming step (a) is carried out for an interval of time from 0.5 hour to 4 hours.

21. The method according to claim 6 wherein the at least one structural stabilizer precursor comprises cobalt.

22. A method for making a stabilized transition alumina catalyst support and preparing a Fischer-Tropsch catalyst supported on said stabilized transition alumina catalyst support, said method comprising the following steps for making a stabilized transition alumina catalyst support:

(i) steaming a transition alumina cornprisin a hase selected from the group consisting of $\gamma$-$Al_2O_3$, $\delta$-$Al_2O_3$, $\theta$-$Al_2O_3$ and any combination thereof, said steaming step being carried out at conditions sufficient to at least partially transform the transition alumina to at least one phase selected from the group consisting of boehmite, pseudo-boehmite and combination thereof, and to form a boehmite material, wherein said sufficient conditions comprise a temperature between 180° C. and 300° C.;

(ii) before or after the steaming (i), impregnating at least one structural stabilizer, whereby a stabilizer-containing boehmite alumina is generated from steps (i) and (ii); and (iii) then calcining the stabilizer-containing boehmite alumina at a temperature between 400° C. and 900° C. to yield the stabilized transition alumina catalyst support, said stabilized transition alumina catalyst support comprising a $\gamma$-$Al_2O_3$ phase and a pore volume from about 0.2 $cm^3/g$ to about 0.6 $cm^3/g$; and said method further comprising the following steps for making the Fischer-Tropsch catalyst:

(a) introducing at least one catalytic metal precursor to the stabilized transition alumina catalyst support of step (iii) to provide a catalyst-impregnated support;

(b) optionally, introducing at least one cocatalytic metal precursor to the catalyst-impregnated support to provide a cocatalyst-impregnated support;

(c) optionally, introducing at least one promoter precursor to the cocatalyst-impregnated support to provide a promoter-impregnated support;

(d) optionally, drying the catalyst-impregnated support at conditions effective for removing any solvents used in introducing at least one of the precursors of steps (a), (b) and (c), wherein drying provides a dried catalyst-impregnated support; and (e) calcining the catalyst-impregnated support at conditions effective for decomposing at least one of the precursors of steps (a), (b) and (c) to the corresponding oxides.

23. The method according to claim 22 wherein the at least one catalytic metal precursor comprises at least one metal selected from the group consisting of cobalt, iron, ruthenium and nickel.

24. The method according to claim 22 wherein the at least one catalytic metal precursor comprises cobalt.

25. The method according to claim 22 wherein the at least one catalytic metal precursor is added in an amount sufficient for delivering an amount of catalytic metal to the stabilized transition alumina catalyst support that is between 5% and 50% by weight of catalytic metal relative to a weight of the support.

26. The method according to claim 22 wherein the at least one catalytic metal precursor is added in an amount sufficient for delivering an amount of catalytic metal to the stabilized transition alumina catalyst support that is between 10% and 40% by weight of catalytic metal relative to a weight of the support.

27. The method according to claim 22 wherein the at least one catalytic metal precursor is added in an amount sufficient for delivering an amount of catalytic metal to the stabilized transition alumina catalyst support that is between 15% and 35% by weight of catalytic metal relative to a weight of the support.

28. The method according to claim 22 wherein the at least one cocatalytic metal precursor in step (b) comprises at least one metal selected from the group consisting of metals from Groups IIIA, IVA, VA, VIA, VIIA, VIIIA, IB and IIB.

29. The method according to claim 22 wherein the at least one cocatalytic metal precursor in step (b) comprises at least one metal selected from the group consisting of ruthenium, hafnium, cerium, copper, thorium, zirconium, rhenium and titanium.

30. The method according to claim 22 wherein the at least one cocatalytic metal precursor in step (b) is added in an amount sufficient for delivering an amount of cocatalytic metal to the catalyst-impregnated support that is between 0.001% and 20% by weight of the cocatalytic metal relative to a weight of the support.

31. The method according to claim 22 wherein the at least one cocatalytic metal precursor in step (b) is added in an amount sufficient for delivering an amount of cocatalytic metal to the catalyst-impregnated support that is between 0.005% and 10% by weight of the cocatalytic metal relative to a weight of the support.

32. The method according to claim 22 wherein the at least one cocatalytic metal precursor in step (b) is added in an amount sufficient for delivering an amount of cocatalytic metal to the catalyst-impregnated support that is between 0.01% and 5% by weight of the cocatalytic metal relative to a weight of the support.

33. The method according to claim 22 wherein the at least one promoter precursor in step (c) comprises at least one element selected from Groups IA, IIA, IIIB, IVB, VB, VIB and VIIB.

34. The method according to claim 22 wherein the at least one promoter precursor in step (c) comprises at least one element selected from the group consisting of elements from boron, palladium, platinum, silver, gold, nickel, copper, the alkali metals, the alkaline earth metals, the actinides and the lanthanides.

35. The method according to claim 22 wherein the at least one promoter precursor in step (c) comprises boron.

36. The method according to claim 22 wherein the at least one promoter precursor in step (c) is added in an amount sufficient for delivering an amount of promoter to the stabilized transition alumina catalyst support that is between 0.005% and 20% by weight of the promoter relative to a weight of the support.

37. The method according to claim 22 wherein the at least one promoter precursor in step (c) is added in an amount sufficient for delivering an amount of promoter to the stabilized transition alumina catalyst support that is between 0.01% and 10% by weight of the promoter relative to a weight of the support.

38. The method according to claim 22 wherein the at least one promoter precursor in step (c) is added in an amount sufficient for delivering an amount of promoter to the stabilized transition alumina catalyst support that is between 0.02% and 5% by weight of the promoter relative to a weight of the support.

39. The method according to claim 22 wherein the effective conditions of step (e) comprise a temperature between 200° C. and 500° C.

40. The method according to claim 22 wherein the effective conditions of step (e) comprise a temperature between 300° C. and 400° C.

41. The method according to claim 22 wherein the effective conditions of step (e) comprise a pressure between 1 atm and 10 atm.

42. The method according to claim 22 wherein the effective conditions of step (e) comprise a pressure between 1 atm and 5 atm.

43. The method according to claim 22 wherein the effective conditions of step (e) comprise a pressure of 1 atm.

44. The method according to claim 22 wherein at least one of steps (a), (b), (c), (d), and (e) is executed more than once.

45. The method according to claim 22 wherein any combination of steps (a), (b) and (c) are executed concurrently.

46. The method according to claim 22 wherein step (c) is carried out simultaneous with step (a).

47. The method according to claim 22 wherein step (c) is carried out simultaneous with step (b).

48. The method according to claim 22 wherein step (b) is carried out more than once.

49. The method according to claim 22 wherein the catalyst is effective for converting synthesis gas to produce the product mixture having an alpha value of at least 0.85.

50. The method according to claim 22 wherein the catalyst is effective for converting synthesis gas to produce a product mixture comprising primarily hydrocarbons of at least 5 carbon atoms.

51. The method according to claim 22 wherein the transition alumina comprises a $\gamma$-$Al_2O_3$ phase.

52. The method according to claim 22 wherein the stabilized transition alumina further comprises a phase selected from the group consisting of $\delta$-$Al_2O_3$, $\theta$-$Al_2O_3$ and any combination thereof.

53. The method according to claim 22 wherein the at least one structural stabilizer precursor comprises at least one element selected from the group consisting of boron, magnesium, silicon, calcium, titanium, chromium, manganese, iron, cobalt, nickel, copper, zinc, gallium, strontium, zirconium, barium, selenium and the lanthanides, including lanthanum, cenum, praseodymium, neodymium, promethium, samarium, europium, gadolinium, terbium, dysprosium, holmium, erbium, thulium, ytterbium and lutetium.

54. The method according to claim 22 wherein the at least one structural stabilizer precursor comprises at least one element selected from the group consisting of boron, cobalt, zirconium and combinations thereof.

55. The method according to claim 22 wherein at least two structural stabilizer precursors are introduced to the transition alumina.

56. The method according to claim 22 wherein the at least one structural stabilizer precursor is introduced in a manner and an amount effective for delivering an amount of structural stabilizer precursor between 0.1% and 20% by weight of structural stabilizer precursor relative to a final weight of the stabilized transition alumina.

57. The method according to claim 22 wherein the at least one structural stabilizer precursor is introduced in a manner and an amount effective for delivering an amount of structural stabilizer precursor between 1% and 10% by weight of structural stabilizer precursor relative to the final weight of a stabilized transition alumina.

58. The method according to claim 22 wherein the at least one structural stabilizer precursor is introduced in a manner and an amount effective for delivering an amount of structural stabilizer precursor between 1% and 5% by weight of structural stabilizer precursor relative to a final weight of the stabilized transition alumina.

59. The method according to claim 22 wherein the making of the catalyst support further includes drying the stabilizer-impregnated alumina, and wherein said drying step is carried out at a temperature between 50° C. and 200° C.

60. The method according to claim 22 wherein the sufficient conditions of steaming step (i) comprise a water vapor partial pressure between 1 bar and 5 bars.

61. The method according to claim 22 wherein the sufficient conditions of steaming step (i) comprise a water vapor partial pressure between 2 bars and 4 bars.

62. The method according to claim 22 wherein the steaming step (i) is carried out for an interval of time from 0.5 hour to 4 hours.

63. A process for producing a product mixture comprising paraffinic hydrocarbons, comprising:
   contacting a reactant gas mixture comprising synthesis gas with a catalyst under conditions and in a reactor effective for at least partially transforming the synthesis gas to the product mixture, wherein the catalyst comprises
   a stabilized transition alumina catalyst support comprising a $\gamma$-$Al_2O_3$ phase and a pore volume between 0.2 $cm^3$/g and 0.6 $cm^3$/g,
   at least one catalytic metal;

optionally at least one cocatalytic metal;
and optionally at least one promoter,
wherein the stabilized transition alumina catalyst support is characterized by the presence of at least one structural stabilizer selected from the group consisting of boron, magnesium, silicon, calcium, titanium, chromium, manganese, iron, cobalt, nickel, copper, zinc, gallium, strontium, zirconium, barium, selenium and the lanthanides, including lanthanum, cerium, praseodymium, neodymium, promethium, samarium, europium, gadolinium, terbium, dysprosium, holmium, erbium, thulium, ytterbium and lutetium, and further
wherein the stabilized transition alumina catalyst support is made by a method comprising steaming a transition alumina comprising a phase selected from the group consisting of $\gamma\text{-}Al_2O_3$, $\delta\text{-}Al_2O_3$, $\theta\text{-}Al_2O_3$ and any combination thereof at conditions comprising a temperature between 180° C. and 300° C. sufficient to at least partially transform said transition alumina to at least one phase selected from the group consisting of boehmite, pseudoboehmite, and combination thereof, and to form a boehmite material, said steaming step being carried out before or after impregnation of a structural stabilizer precursor, whereby a stabilizer-containing boehmite alumina is generated, and then calcining the stabilizer-containing boehmite alumina at a temperature between 400° C. and 900° C. to yield said stabilized transition alumina catalyst support.

64. The process according to claim 63 wherein the process is effective for producing the product mixture having an alpha value of at least 0.85.

65. The process according to claim 63 wherein the process is effective for producing a product mixture comprising primarily hydrocarbons of at least 5 carbon atoms.

* * * * *